United States Patent
Mullins et al.

(10) Patent No.: US 10,481,960 B2
(45) Date of Patent: Nov. 19, 2019

(54) INGRESS AND EGRESS OF DATA USING CALLBACK NOTIFICATIONS

(71) Applicant: Microsoft Technology Licensing, LLC, Redmond, WA (US)

(72) Inventors: Christopher L. Mullins, Redmond, WA (US); Henrik Frystyk Nielsen, Hunts Point, WA (US); John A. Taylor, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 146 days.

(21) Appl. No.: 15/343,815

(22) Filed: Nov. 4, 2016

(65) Prior Publication Data
US 2018/0129546 A1 May 10, 2018

(51) Int. Cl.
*G06F 9/54* (2006.01)

(52) U.S. Cl.
CPC .................................... *G06F 9/542* (2013.01)

(58) Field of Classification Search
None
See application file for complete search history.

(56) References Cited

U.S. PATENT DOCUMENTS

| | | | |
|---|---|---|---|
| 5,721,943 A | 2/1998 | Johnson | |
| 6,560,592 B1 | 5/2003 | Reid et al. | |
| 6,947,943 B2 | 9/2005 | Deanna et al. | |
| 7,016,880 B1 | 3/2006 | Adams et al. | |
| 7,068,849 B2 | 6/2006 | Zandi et al. | |
| 7,069,335 B1 | 6/2006 | Layman et al. | |
| 7,418,497 B2 | 8/2008 | Hagale et al. | |

(Continued)

FOREIGN PATENT DOCUMENTS

| | | |
|---|---|---|
| CN | 103714129 | 4/2014 |
| EP | 1681645 | 7/2006 |

(Continued)

OTHER PUBLICATIONS

Jorge, et al., "Post-Processing Operators for Browsing Large Sets of Association Rules", In Proceedings of the 5th Int'l. Conference on Discovery Science, Nov. 24, 2002, 4 pages.

(Continued)

*Primary Examiner* — Syed A Roni

(57) ABSTRACT

Examples of the present disclosure describe systems and methods of data ingress and egress using callback notifications. In an example, a callback notification may be received. The notification may comprise one or more resources, which may be extracted. The extracted resources may be associated with resource identifiers. One or more inference rules from an inference ruleset may be applied to the extracted resources to generate any related inferred relationships. The resource identifiers and inferred relationships may be stored in an isolated collection. The content or structure of the isolated collection may satisfy a notification rule within a notification ruleset. The notification rule may be associated with a recipient. As a result of the determination, the recipient may receive a callback notification. In some examples, the callback notification may comprise a change notification or one or more resource identifiers, associated resources, or relationships from the isolated collection.

20 Claims, 15 Drawing Sheets

(56) References Cited

U.S. PATENT DOCUMENTS

| | | |
|---|---|---|
| 7,668,834 B2 | 2/2010 | McCullough |
| 7,702,603 B1 | 4/2010 | Hauser |
| 8,001,551 B2 | 8/2011 | Le Roy et al. |
| 8,112,377 B2 | 2/2012 | Schmidt |
| 8,140,362 B2 | 3/2012 | Deshpande et al. |
| 8,185,558 B1 | 5/2012 | Narayanan et al. |
| 8,428,981 B2 | 4/2013 | Li et al. |
| 8,429,179 B1 | 4/2013 | Mirhaji |
| 8,443,005 B1 | 5/2013 | Goldman et al. |
| 8,620,964 B2 | 12/2013 | Tsatsou et al. |
| 8,739,016 B1 | 5/2014 | Goldman et al. |
| 8,788,330 B2 | 7/2014 | Leffert |
| 8,825,711 B2 | 9/2014 | Chan et al. |
| 8,838,707 B2 | 9/2014 | Lawson et al. |
| 9,075,873 B2 | 7/2015 | Vanderwende et al. |
| 9,087,236 B2 | 7/2015 | Dhoolia et al. |
| 9,301,016 B2 | 3/2016 | Archibong et al. |
| 9,317,557 B2 | 4/2016 | Shao et al. |
| 9,336,306 B2 | 5/2016 | McAteer et al. |
| 9,342,622 B2 | 5/2016 | Segaran |
| 9,348,880 B1 | 5/2016 | Kramer et al. |
| 9,367,809 B2 | 6/2016 | Puri et al. |
| 9,396,046 B2 | 7/2016 | Laredo et al. |
| 9,400,822 B2 | 7/2016 | Schrock et al. |
| 2002/0123956 A1 | 9/2002 | Galuten |
| 2003/0217033 A1 | 11/2003 | Sandler et al. |
| 2003/0217081 A1 | 11/2003 | White et al. |
| 2005/0193361 A1 | 9/2005 | Vitanov et al. |
| 2005/0276479 A1 | 12/2005 | Goldberg et al. |
| 2005/0278354 A1 | 12/2005 | Gupta et al. |
| 2006/0155725 A1 | 7/2006 | Foster et al. |
| 2007/0179995 A1 | 8/2007 | Prahlad et al. |
| 2007/0282711 A1 | 12/2007 | Ullman et al. |
| 2008/0082466 A1 | 4/2008 | Meijer et al. |
| 2008/0140602 A1 | 6/2008 | Roth et al. |
| 2008/0178164 A1 | 7/2008 | Brown et al. |
| 2008/0307337 A1 | 12/2008 | Marinkovich et al. |
| 2009/0024648 A1 | 1/2009 | Heix et al. |
| 2009/0063559 A1 | 3/2009 | Rhodes et al. |
| 2009/0070299 A1 | 3/2009 | Parikh et al. |
| 2009/0089265 A1 | 4/2009 | Saito et al. |
| 2009/0187517 A1 | 7/2009 | Mihalkova et al. |
| 2009/0259944 A1 | 10/2009 | Wu |
| 2010/0023481 A1 | 1/2010 | Mcgoveran |
| 2010/0030725 A1 | 2/2010 | Mendis et al. |
| 2010/0036788 A1 | 2/2010 | Wu et al. |
| 2010/0082646 A1 | 4/2010 | Meek et al. |
| 2010/0223223 A1 | 9/2010 | Sandler et al. |
| 2010/0318488 A1 | 12/2010 | Oliver et al. |
| 2012/0185826 A1 | 7/2012 | Wheeler et al. |
| 2013/0238667 A1* | 2/2013 | Carvalho |
| 2013/0117185 A1 | 5/2013 | Collison et al. |
| 2013/0246435 A1 | 9/2013 | Yan et al. |
| 2014/0046981 A1 | 2/2014 | Adams et al. |
| 2014/0067850 A1 | 3/2014 | Schrock et al. |
| 2014/0129504 A1 | 5/2014 | Soon-Shiong |
| 2014/0164298 A1 | 6/2014 | Goranson et al. |
| 2014/0172914 A1 | 6/2014 | Elnikety et al. |
| 2014/0330594 A1 | 11/2014 | Roberts et al. |
| 2014/0337373 A1 | 11/2014 | Morsi et al. |
| 2015/0072653 A1 | 3/2015 | Fan et al. |
| 2015/0128121 A1 | 5/2015 | Garcia |
| 2015/0242186 A1 | 8/2015 | Yuen et al. |
| 2015/0280999 A1 | 10/2015 | Chart et al. |
| 2015/0379409 A1 | 12/2015 | Hu et al. |
| 2016/0055423 A1 | 2/2016 | Buchanan et al. |
| 2016/0077920 A1 | 3/2016 | Regni et al. |
| 2016/0149953 A1 | 5/2016 | Hidayat |
| 2016/0224674 A1 | 8/2016 | Miller et al. |
| 2016/0275347 A1* | 9/2016 | Sukhodolov |
| 2016/0301766 A1 | 10/2016 | Ionescu et al. |
| 2017/0097984 A1 | 4/2017 | Haldar |
| 2018/0129695 A1 | 5/2018 | Standefer et al. |
| 2018/0129697 A1 | 5/2018 | Mullins et al. |
| 2018/0129715 A1 | 5/2018 | Standefer et al. |
| 2018/0129751 A1 | 5/2018 | Mullins et al. |
| 2018/0129951 A1 | 5/2018 | Standefer et al. |

FOREIGN PATENT DOCUMENTS

| | | |
|---|---|---|
| WO | 175679 | 10/2001 |
| WO | 2007048432 | 5/2007 |

OTHER PUBLICATIONS

PCT International Search Report and Written Opinion Issued in Application No. PCT/US2017/059629, dated Dec. 22, 2017, 14 Pages.

Saygin et al., "Association Rules for Supporting Hoarding in Mobile Computing Environments", In Proceedings of Tenth International Workshop on Research Issues in Data Engineering, Feb. 29, 2000, 2 pages.

Wing, et al., "Smart Retrieval and Sharing of Information Resources Based on Contexts of User-Information Relationships", In the Proceedings of the 19th International Conference on Advanced Information Networking and Applications(AINA), vol. 2, Mar. 25, 2005, 6 Pages.

PCT International Search Report and Written Opinion Issued in Application No. PCT/US2017/059621, dated Jan. 16, 2018, 11 Pages.

"Non Final Office Action Issued in U.S. Appl. No. 15/344,109", dated Oct. 4, 2018, 17 Pages.

"International Search Report and Written Opinion Issued in PCT Application No. PCT/US17/059626", dated May 28, 2018, 16 pages.

"Invitation to Pay Additional Fee Issued in PCT Application No. PCT/US17/059626", dated Apr. 3, 2018, 10 Pages.

"File Versioning Rules", http://web.archive.org/web/20111004024745/http://msdn.microsoft.com/en-us/library/windows/desktop/aa368599(v=V5.85).aspx, Oct. 4, 2011, 2 pages.

"Keeping previous versions installed when installing CC 2015 applications", https://blogs.adobe.com/creativecloud/keeping-previous-versions-installed-when-installing-cc-2015-applications/, Jun. 15, 2015, 2 pages.

"Receiving API Updates in Real Time with Webhooks", https://developers.facebook.com/docs/graph-api/webhooks, Oct. 12, 2016, 8 pages.

"Subscribe for webhooks to get change notifications", https://msdn.microsoft.com/en-us/office/office365/howto/onenote-sync, May 30, 2016, 3 pages.

"Webhooks", http://web.archive.org/web/20150207190001/https://developer.github.com/webhooks/, Feb. 7, 2015, 5 pages.

asp.net Dynamic Data, https://web.archive.org/web/20100421030207/http://msdn.microsoft.com/en-us/library/ee845452.aspx, Apr. 21, 2010, 7 pages.

Croitoru, et al., "A Conceptual Graph Based Approach to Ontology Similarity Measure", In Proceedings of 15th International Conference on Conceptual Structures, Jul. 22, 2007, 154-164 pages.

Dynamic model: adding new properties to virtual member manager entities at runtime, http://www.ibm.c,om/support/knowledgecenter/SSAW57_7.0.0/com.ibm.websphere.wim.doc/dynamicmodeladdingnewpropertiestowimentitiesatruntime.html, Oct. 14, 2016, 2 pages.

Dynamic\ user extensible entities using entity framework, http://stackoverflow.com/questions/15019705/dynamic-user-extensible-entities-using-entity-framework, Retrieved on: Oct. 14, 2016, 4 pages.

Ead, Stephen, "Proof-Theoretic Validity", In Journal of Foundations of Logical Consequence, Apr. 16, 2012, 22 pages.

Gao, et al., "Ontology-Based Semantic Similarity: A New Approach Based on Analysis of the Concept Intent", In Proceedings of the International Conference on Machine Learning and Cybernetics, Jul. 14, 2013, pp. 676-681.

Gasse, et al., "Rewriting Rules into SROIQ Axioms", In Proceedings of 21st International Workshop on Description Logics, May 13, 2008, 10 pages.

(56) References Cited

OTHER PUBLICATIONS

Goedtel, et al., "Azure Automation webhooks", https://azure.microsoft.com/en-us/documentation/articles/automation-webhooks/, Sep. 12, 2016, 12 pages.

Hu, et al., "GMO: A Graph Matching for Ontologies", In Proceedings of the K-CAP Workshop on Integrating Ontologies, Oct. 2, 2005, 8 pages.

Irani, Romin, "Flow to Integrate Webhooks with the Slack API", http://www.programmableweb.com/news/how-to-integrate-webhooks-slack-api/how-to/2015/10/20, 2015, Oct. 20, 2015, 8 pages.

Leggetter, Phil, "What are WebHooks and How Do They Enable a Real-time Web?", http://www.programmableweb.com/news/what-are-webhooks-and-how-do-they-enable-real-time-web/2012/01/30, Jan. 30, 2012, 5 pages.

Malihi, Ardy, "Entity Framework Dynamic Model Builder", https://github.com/ardymalihi/Dynamix-EntityFramework, Oct. 14, 2016, 3 pages.

Nielsen, Henrik F, "Introducing Microsoft asp.net WebHooks Preview", https://blogs.msdn.microsoft.com/webdev/2015/09/04/introducing-microsoft-asp-net-webhooks-preview/, Sep. 4, 2015, 17 pages.

Omelayenko, et al., "Tracking Changes in RDF(S) Repositories", In Proceedings of the Workshop on Knowledge Transformation for the Semantic Web, Jul. 23, 2012, 121 pages.

Pujara, et al., "Ontology-Aware Partitioning for Knowledge Graph Identification", In Proceedings of the workshop on automated knowledge base construction, Oct. 27, 2013, 5 pages.

Sumurthy, et al., "Working with Webhooks in Microsoft Graph", Oct. 12, 2016, 4 pages.

Thornber, K. K., "A Key to Fuzzy-Logic Inference", In International Journal of Approximate Reasoning, February, Feb. 1993, pp. 105-121.

Vanderlyn, et al., "Similarity in Semantic Graphs: Combining Structural, Literal, and Ontology-based Measures", In Proceedings of Tenth International Conference on Semantic Technology for Intelligence, Defense, and Security, Nov. 18, 2015, pp. 1-8.

Vega, Diego, "Support for "dynamic" entity models", https://github.com/aspnet/EntityFramework/issues/2282, May 28, 2015, 3 pages.

Zhang, et al., "Semantic similarity between ontologies at different scales", In Proceedings of IEEE/CAA Journal of Automatica Sinica, vol. 3, Issue 2, Apr. 10, 2016, pp. 132-140.

"Non Final Office Action Issued in U.S. Appl. No. 15/344,259", dated Jan. 10, 2019, 7 Pages.

"Non Final Office Action Issued in U.S. Appl. No. 15/344,336", dated Jan. 28, 2019, 31 Pages.

"Non Final Office Action Issued in U.S. Appl. No. 15/344,405", dated May 8, 2019, 21 Pages.

"Non Final Office Action Issued in U.S. Appl. No. 15/344,027", dated Jun. 27, 2019, 35 pages.

"Final Office Action Issued in U.S. Appl. No. 15/344,336 ", dated Aug. 7, 2019, 6 pages.

\* cited by examiner

Query: http://.../collection300/task123?$expand=taskOn

Query: http://.../collection300/task123

INGRESS AND EGRESS OF DATA USING CALLBACK NOTIFICATIONS

BACKGROUND

Callback notifications enable software systems, developers, and users to customize actions in response to events. Callback notifications have a wide range of potential applications and uses within software development, interactions with application programming interfaces (APIs), and web application development. Despite the fact that a wide variety of software and services make use of callback notification functionality, there is currently no easy, convenient, and powerful way to combine and process callback notifications in aggregate.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

This summary is provided to introduce a selection of concepts in a simplified form that are further described below in the Detail Description section. This summary is not intended to identify key features or essential features of the claimed subject matter, nor is it intended to be used as an aid in determining the scope of the claimed subject matter.

Examples of the present disclosure describe systems and methods of data ingress and egress using callback notifications. In an example, a callback notification may be received. The notification may comprise one or more resources, which may be extracted. The extracted resources may be associated with resource identifiers. One or more inference rules from an inference ruleset may be applied to the extracted resources to generate any related inferred relationships. The resource identifiers and inferred relationships may be stored in an isolated collection.

In another example, it may be determined that the content or structure of the isolated collection satisfies a notification rule within a notification ruleset. The notification rule may be associated with a recipient. As a result of the determination, the recipient may receive a callback notification. In some examples, the callback notification may comprise a change notification or one or more resource identifiers, associated resources, or relationships from the isolated collection.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

DETAILED DESCRIPTION

Figure 1:
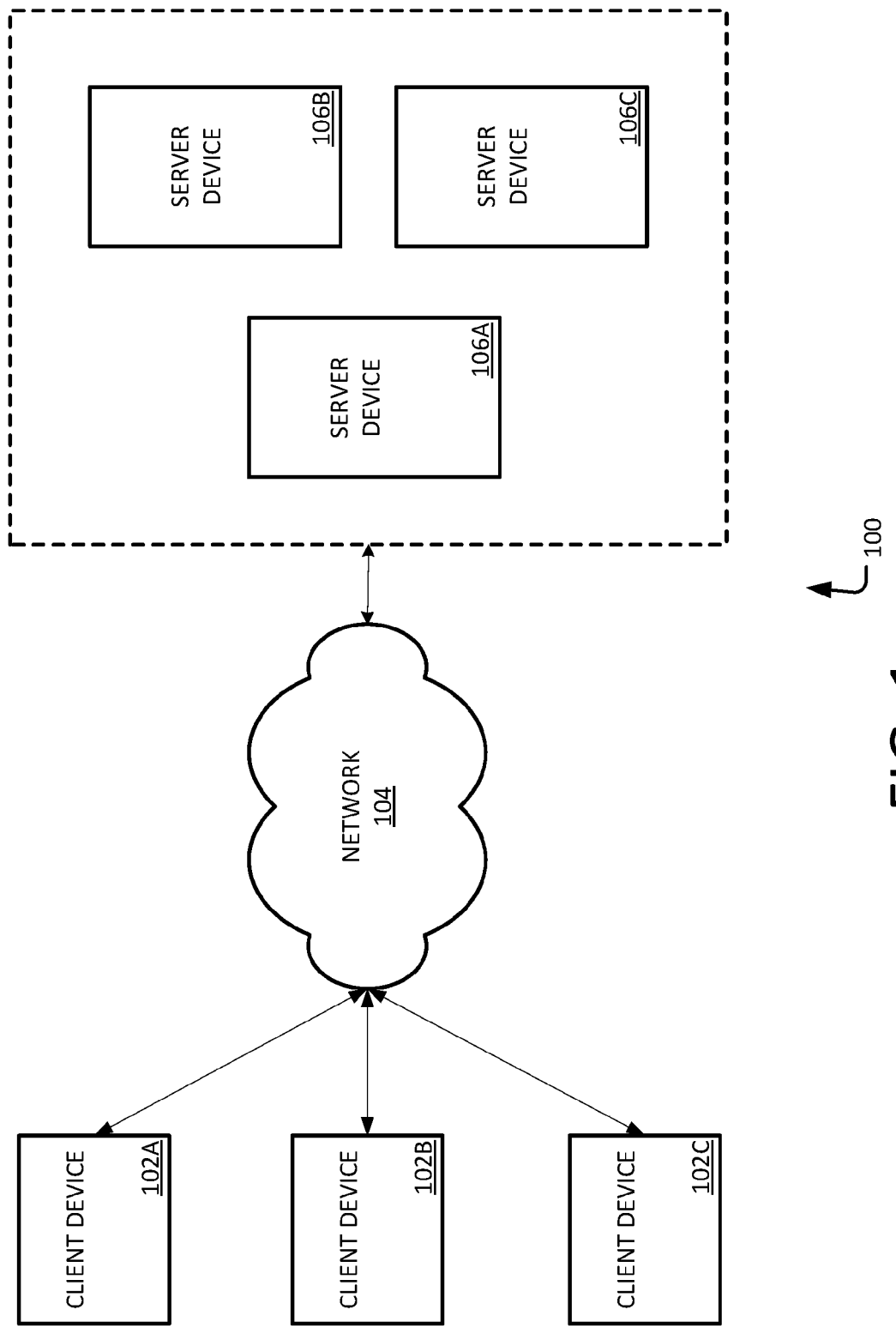
FIG. 1 illustrates an overview of an example system for ingress and egress of data using callback notifications.

Various aspects of the disclosure are described more fully below with reference to the accompanying drawings, which form a part hereof, and which show specific exemplary aspects. However, different aspects of the disclosure may be implemented in many different forms and should not be construed as limited to the aspects set forth herein; rather, these aspects are provided so that this disclosure will be thorough and complete, and will fully convey the scope of the aspects to those skilled in the art. Aspects may be practiced as methods, systems or devices. Accordingly, aspects may take the form of a hardware implementation, an entirely software implementation or an implementation combining software and hardware aspects. The following detailed description is, therefore, not to be taken in a limiting sense.

The present disclosure provides systems and methods of generating and querying isolated collections of resources, or resource identifiers, and the relationships between those resources or resource identifiers. The resources and/or relationships may be provided by a developer or other source. The resources and relationships may also be inferred by executing a rule set against the isolated collection. Further, access to the isolated collection may be controlled through various techniques to provide additional security measures for the content in each isolated collection. As used herein, an isolated collection may be referred as a "Set."

Callback notifications are used to provide customizable actions in response to events. Callback notifications may be used in the context of software development, developer interaction with an API, and web application development. One of skill in the art will appreciate that callback notifications may be used in other contexts and in response to a wide variety of events without departing from the spirit of this disclosure. In one example, a callback notification may be a customized Hypertext Transfer Protocol (HTTP callback known as a webhook.

Webhooks provide a mechanism for the simple transmission of data and event notifications across different software services and platforms. Developers may provide callback functionality by permitting users or other software services and platforms to provide customized callback URLs. Once an event occurs, a request may be transmitted using the callback URL (e.g. via a POST request), thereby alerting an outside system of the event. The notification may be provided in a variety of formats (e.g., JavaScript Object Notation (JSON), Extensible Markup Language (XML), etc.) and may contain additional information about the event. Upon receiving the callback notification, the recipient system may process the event notification and take further action.

Due to their simplicity, a wide variety of software services and platforms provide webhook callback functionality. As a result, a user or system may receive a multitude of self-contained callback notifications from a variety of software services and platforms. There is currently no easy, convenient, and powerful way to combine and process webhooks in aggregate.

In some examples, an isolated collection (discussed below in further detail) may be populated, updated, or otherwise modified using resources extracted from a received callback notification (e.g., a webhook). As used herein, an extracted resource may be a resource, or information about a resource, that is received from a callback notification. In some examples, resources may be extracted from a plurality of received callback notifications. An extracted resource may be associated with an extracted resource identifier. In an example, an extracted resource may be stored in a data collection and the extracted resource identifier may be a uniform resource identifier used to access the extracted resource in the data collection. Alternatively, the isolated collection may be populated with information about resources received from a callback notification instead of the actual resource itself. For example, the extracted resource may instead reside on a remote server, where the resource identifier facilitates retrieval of the resource (e.g., the resource may be stored on a remote web server, where the resource identifier comprises a uniform resource locator). Identifying the location of a resource may include parsing the resource identifier using, for example, regular expressions, providing one or more portions of the resource identifier to a search utility, executing the resource identifier, etc.

An inference ruleset may be associated with an isolated collection, comprising rules which may be applied to one or more extracted resources. In some examples, there may be multiple inference rulesets associated with an isolated collection. An inference ruleset may also be associated with certain attributes or characteristics of the extracted resources or the received callback notification (e.g., the source of the notification, the type of data contained within the notification, etc.). In one example, rules may be created by providing properties that enable an inference to be made about a relationship between a plurality of resources. The relationship may be defined and associated with the provided properties, thereby creating an inference rule. The inference rule may then be stored in an inference ruleset.

Rules contained within an inference ruleset may be used to generate inferred relationships based on one or more extracted resources. Inferred relationships may describe relationships among extracted resources or between extracted resources and resources already existing in an isolated collection. In one example, generating inferred relationships may also result in updating pre-existing relationships within an isolated collection. The resource identifiers and inferred relationships associated with the extracted resources may be stored within an isolated collection.

As a result of updating the contents of an isolated collection, a defined isolated collection state may be achieved, which may result in one or more callback notifications. In some examples, the isolated collection state and associated callback may be defined as a notification rule within a notification ruleset. The isolated collection state may indicate a requirement that one or more relationships exist among a plurality of resource identifiers or associated resources. In an example, a notify-on-change rule may describe a specific isolated collection state, wherein if at least one resource or relationship is modified or updated, a callback notification may be provided to one or more of the other resources, users, applications, processes, entities, etc. In one example, a notify-on-change rule may be indicated as a relationship among a plurality of resource identifiers, wherein at least one of the resource identifiers will be the recipient of a callback notification.

A callback notification may define a recipient. In an example, the callback notification recipient may be a resource within an isolated collection comprising a resource identifier associated with a recipient resource. The resource identifier may be associated with a computing device, including a storage system, a mobile device, a remote server, or a computing cluster. One of skill in the art will appreciate that other electronic devices may receive the callback notification without departing from the spirit of this disclosure. In one example, the recipient resource may comprise or be associated with a webhook, further comprising a URL, identity token, and/or authentication information. In another example, the resource identifier may be associated with a person. The person may be notified using a means of electronic communication, including electronic mail, instant message, text message, or an on-screen notification. One of skill in the art will appreciate that other notification methods may be used without departing from the spirit of this disclosure.

In one example, the recipient resource identifier may comprise a recipient uniform resource identifier, a subscription identifier, and an application identifier. The uniform resource identifier may be associated with a resource which is stored by a storage system (e.g., a data cluster, a remote server, a local storage device, etc.). In other examples, the uniform resource identifier may be associated with a web server (e.g., a webhook callback recipient). The subscription identifier may be an identifier that was generated when the callback was created. The application identifier may be an identifier associated with the recipient application. In an example, a callback notification may further comprise a "caller state," wherein the caller state provides context relating to callback creation (e.g., a reminder to the recipient that the callback was created on behalf of a resource or associated resource identifier).

In some examples, an isolated collection may receive a callback notification and, as a result of the received callback notification, transmit a subsequent callback notification to a recipient. The isolated collection may receive a callback notification, from which one or more resources may be extracted. As discussed above, the extracted resources may be associated with resource identifiers. Additionally, relationships among the extracted resources may be inferred using inference rules contained within an inference ruleset. The resource identifiers and inferred relationships may then be stored within the isolated collection. As a result of updating the isolated collection using the information contained within the received callback notification, a defined isolated collection state may be achieved, which may, in turn, result in one or more callback notifications. More specifically, one or more notification rules contained within a notification ruleset may be satisfied. A notification rule may be associated with a callback, further indicating a callback recipient. As such, one or more recipients associated with the one or more satisfied notification rules may receive a callback notification as further described herein.

FIG. 1 illustrates an overview of an example system for ingress and egress of data using callback notifications as described herein. Example system 100 may be a combination of interdependent components that interact to form an integrated whole for performing delegated authentication. In aspects, system 100 may include hardware components (e.g., used to execute/run operating system (OS)), and/or software components (e.g., applications, application programming interfaces (APIs), modules, virtual machines, runtime libraries, etc.) running on hardware. In particular aspects, system 100 may provide an environment for software components to execute, evaluate operational constraint sets, and utilize resources or facilities of the system 100. In such aspects, the environment may include, or be installed on, one or more processing devices. For instance, software (e.g., applications, operational instructions, modules, etc.) may be run on a processing device such as a computer, mobile device (e.g., smartphone/phone, tablet, laptop, personal digital assistant (PDA), etc.) and/or any other electronic device. As an example of a processing device operating environment, refer to the exemplary operating environments depicted in FIGS. 9-12. In other instances, the components of systems disclosed herein may be distributed across and executable by multiple devices. For example, input may be entered on a client device and information may be processed or accessed from other devices in a network (e.g. server devices, network appliances, other client devices, etc.).

As presented, system 100 comprises client devices 102A-C, distributed network 104, and a distributed server environment comprising one or more servers, such as server devices 106A-C. One of skill in the art will appreciate that the scale of systems such as system 100 may vary and may include additional or fewer components than those described in FIG. 1. In some aspects, interfacing between components of the system 100 may occur remotely, for example, where components of system 100 may be distributed across one or more devices of a distributed network.

In aspects, client devices 102A-C may be configured to receive input via a user interface component or other input means. Examples of input may include voice, visual, touch and text input. The interface component may enable the creation, modification and navigation of various data sets and graphical representations. In examples, the various datasets may comprise (or be otherwise associated with), for example, resource identifiers, resource metadata, relationship information, asserted relationships, graphical mapping information, query data, rule sets, such as, for example, inference rules, authorization information, authentication information, etc., as discussed in further detail below. Generally, the datasets are stored on one or more server devices 106A-C and are accessible by the client devices 102A-C. In some examples, however, the datasets may be at least partially stored on one or more of the client devices 102A-C. The underlying resources represented in the various datasets may be stored locally or in a data store, such as a cloud storage application, accessible to client devices 102A-C. In at least one example, the underlying resources represented in the various datasets (or portions thereof) may be distributed across client devices 102A-C. For instance, client device 102A (e.g., a mobile phone) may locally store a first portion of the resources represented in the dataset, client device 102B (e.g., a tablet) may locally store a second portion of the resources, and client device 102C (e.g., a laptop) may locally store the remaining portion of the resources represented in the dataset. In examples, the client devices 102A-C may have access to all of the resources included in the data set, may have access to a subset of the resources included in the dataset, or, alternatively, may not have access to any of the resources included in the dataset.

Client devices 102A-C may be further configured to interrogate data stores comprising the resources corresponding to the resource identifiers in the various data sets. In examples, client devices 102A-C may interrogate content providers, such as server device 102A-C, via distributed network 104. The interrogation may include identifying the remote device on which a resource is located, and/or determining whether the remote device (or a service/separate remote device) has authenticated access to the resource. If access to the resource has been authenticated, client devices 102A-C may retrieve an authentication indication from the remote device. Client devices 102A-C may use the authentication indication to provide access to one or more of the various datasets comprising the corresponding resource identifier.

Server devices 106A-C may be configured to store and/or provide access to one or more resources. For example, server device 106A may be a web server, server device 106B may be a device comprising a collaborative messaging tool and a calendaring application, and server device 106C may be electronic mail server. Each of these devices may comprise a repository of resources that is accessible via one or more authentication mechanisms. In examples, server devices 106A-C may perform or monitor the authentication process when a request for a resource is received. If the authentication is successful, the authenticating device may store or maintain an authentication indication for a specified period of time. When the period of time expires, server devices 106A-C may remove or attempt to renew the authentication indication. In examples, server devices 106A-C may provide the authentication indication to an interrogating client device. In some aspects, server devices 106A-C may further be configured to store at least a portion of the various data sets and graphical representations, as discussed above.

Figure 2:
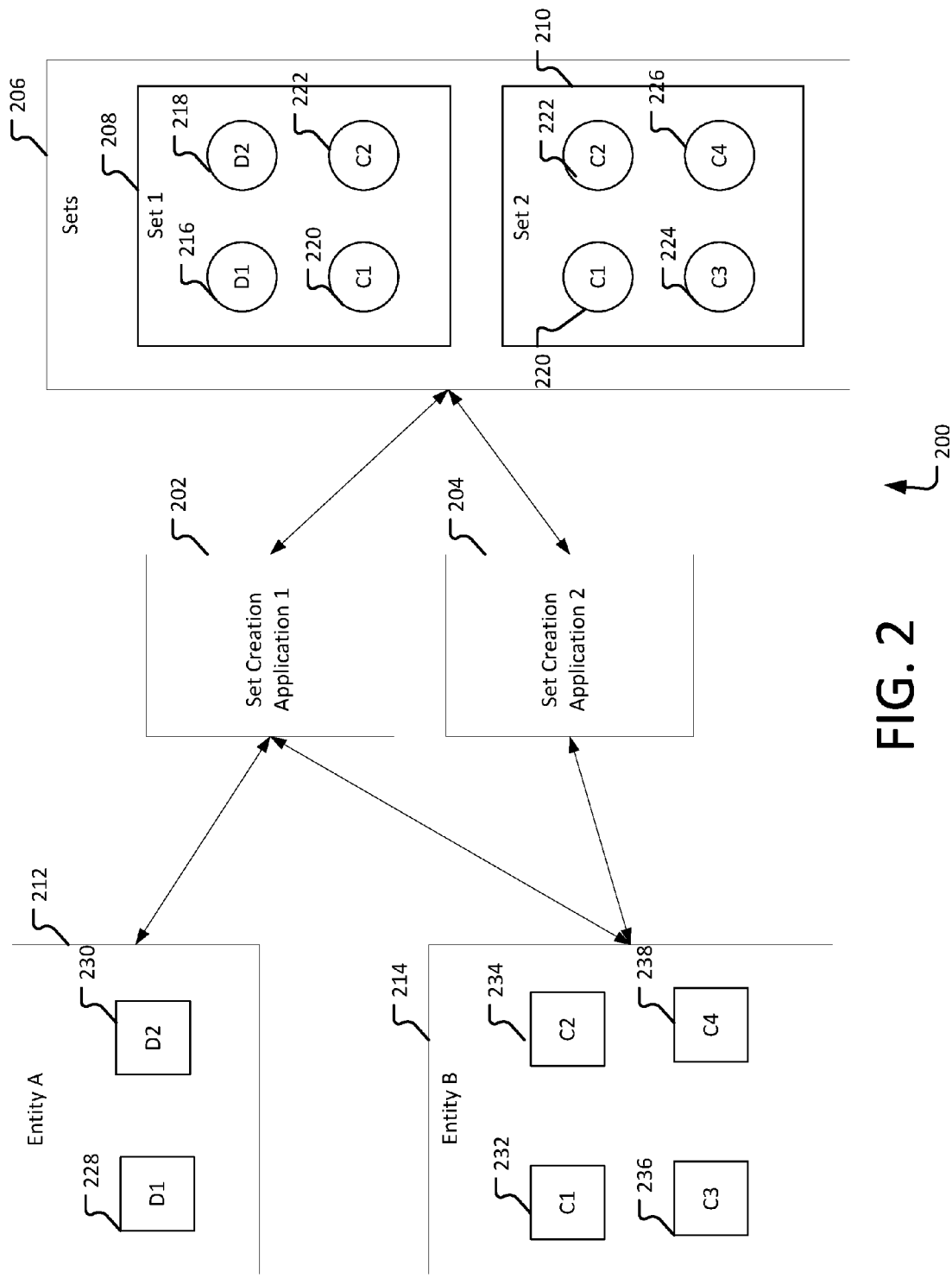
FIG. 2 illustrates an overview of an example system for managing isolated collections of resource identifiers and corresponding relationships.

FIG. 2 illustrates an overview of an example system 200 for managing isolated collections of resource identifiers and corresponding relationships. The isolated collection techniques implemented in system 200 may comprise or be associated with one or more of the delegated authentication techniques described in FIG. 1. In alternative examples, a single device (comprising one or more components such as processor and/or memory) may perform the processing described in systems 100 and 200, respectively.

With respect to FIG. 2, system 200 may comprise Set creation applications 202 and 204, Set environment 206, Sets 208 and 210, entities 212 and 214, resources identifiers 216, 218, 220, 222, 224 and 226, and resources 228, 230, 232, 234, 236 and 238. In aspects, Set creation applications 202 and 204 may be an application or service configured to create, infer, manipulate, navigate and visualize various resources, relationships and graphical representations. Set creation applications 202 and 204 may define collections of relationships between resources (e.g., people, files, tasks, mail, documents, calendar events, etc.) and executing queries on those collections. Set creation applications 202 and 204 may further provide for defining and storing rulesets used to infer one or more relationships in the collections, and displaying graphical representations of the collection data. The defined rulesets may be stored in the Set itself, and in some examples is stored as metadata within the Set. In examples, Set creation applications 202 and 204 may be installed and executed on a client device or on one or more devices in a distributed environment. For instance, Set creation application 202 may be installed on client device 102A, Set creation application 204 may be installed on client device 102B, and a Set creation service associated with server device 106A may be accessible to client device 102C.

In aspects, Set creation applications 202 and 204 may have access to a file directory or an execution environment, such as environment 206. Environment 206 may be co-located with a Set creation application, or environment 206 may be located remotely from the Set creation application. Environment 206 may provide access to one or more data collections, such as Sets 208 and 210. In examples, access to the data collections may be determined using one or more sets of permissions generated and/or maintained by Set creation applications 202 and 204. The sets of permissions may be different across one or more of the data collections. As a result, one or more of the data collections (or functionality associated therewith) may not be accessible from one or more of Set creation applications 202 and 204.

Sets 208 and 210 may respectively comprise isolated collections of asserted resource identifiers and corresponding relationships. The relationships in the isolated collections may be defined manually or may be automatically derived using one or more rulesets. The isolated collections may be represented using graphical structures (e.g., an isolated collection may be displayed as one or more directed graphs) that directly relate resources in the data collection and provide for retrieving relationship data with a single operation. Each isolated collection may comprise resource identifiers that are unique to that isolated collection. Alternately, the isolated collections may comprise resource identifiers included in one or more alternate isolated collections. For example, as depicted in FIG. 2, Set 208 may comprise resource identifiers 216, 218, 220 and 222, and Set 210 may comprise resource identifiers 220, 222, 224 and 226. Resource identifiers 216, 218, 220, 222, 224 and 226 may correspond to, and/or identify the location of, one or more resources. As used herein, a resource identifier references an existing resource, but is not itself a resource. Exemplary types of resource identifiers include, but are not limited to, a Uniform Resource Identifier (e.g., a Uniform Resource Locator (URL), a Uniform Resource Name (URN) etc.), an IP address, a memory or storage address, and the like. One of skill in the art will appreciate that any type of identifier may be employed by the various aspects disclosed herein without departing from the scope of this disclosure. Identifying the location of a resource may include parsing the resource identifier using, for example, regular expressions, providing one or more portions of the resource identifier to a search utility, executing the resource identifier, etc. In aspects, having access to the data collections does not guarantee access to the resources identified by the resource identifiers included in each data collection. For example, although a user may be able to access and manipulate Set 208, the user may not be authorized to access one or more of the underlying resources corresponding to the resource identifier in Set 208.

Resource providers 212 and 214 may be configured to store and/or provide access to one or more resources. As such, a resource provider as used herein may be a data store, a cloud service provider, a client computing device, a server computing device, a distributed system of devices, such as, for example, an enterprise network, an application, a software platform (e.g., an operating system, a database, etc.), and the like. In aspects, resource providers 212 and 214 may be (or have access to) various different data sources, such as content providers, data stores, various sets of application data, and the like. The data stores may comprise one or more resources corresponding to one or more resource identifiers. For example, as depicted in FIG. 2, resource provider 212 may be a data store comprising various different types of resources such as resource 228 (e.g., document 1 (D1)) and resource 230 (e.g., presentation 2 (P1)) and resource provider 214 may be a contact management application comprising contact resources 232 (e.g., contact 1 (C1)), 234 (e.g., contact 2 (C2)), 236 (e.g., contact 3 (C3)) and 238 (e.g., contact 4 (C4)). In this example, resource identifier 216 may correspond to resource 228; resource identifier 218 may correspond to resource 230; resource identifier 220 may correspond to resource 232; resource identifier 222 may correspond to resource 234; resource identifier 224 may correspond to resource 236; and resource identifier 226 may correspond to resource 238. In some aspects, resource providers 212 and 214 may be accessible by Set creation applications 202 and 204. Set creation applications 202 and 204 may access resource providers 212 and 214 to determine the existence of resources and/or retrieve information associated with the resources (e.g., resource metadata, resource location, resource identifiers, permission sets, authentication data, etc.). The information retrieved from resource providers 212 and 214 may be used to determine a set of resource identifiers corresponding to one or more of the available resources. The set of resource identifiers may be used to create one or more isolated collections of asserted resource identifiers and corresponding relationships. As noted above, the resource identifiers may be, or include, a durable URI for its corresponding resource. For instance, the resource identifier 216 may include the URI for the actual document (D1) 228. Accordingly, in such an example, a user is able to determine the location of the document (D1) 228 from the Set, and, depending on authentication and access restrictions, retrieve the document (D1) 228. As another example, as depicted in FIG. 2, resource provider 212 may be accessed by Set creation application 202. Set creation application 202 may determine that resource provider 212 comprises at least resources 228 and 230, and may determine resource identification information for each of the resources. Based on the determined resource identification information, resource identifiers 216 and 218 may be respectively applied/correlated to resources 228 and 230, and provided to environment 206. Environment 206 may then make resource identifiers 216 and 218 eligible for an inclusion analysis into one or more isolated collections.

Figure 3A:
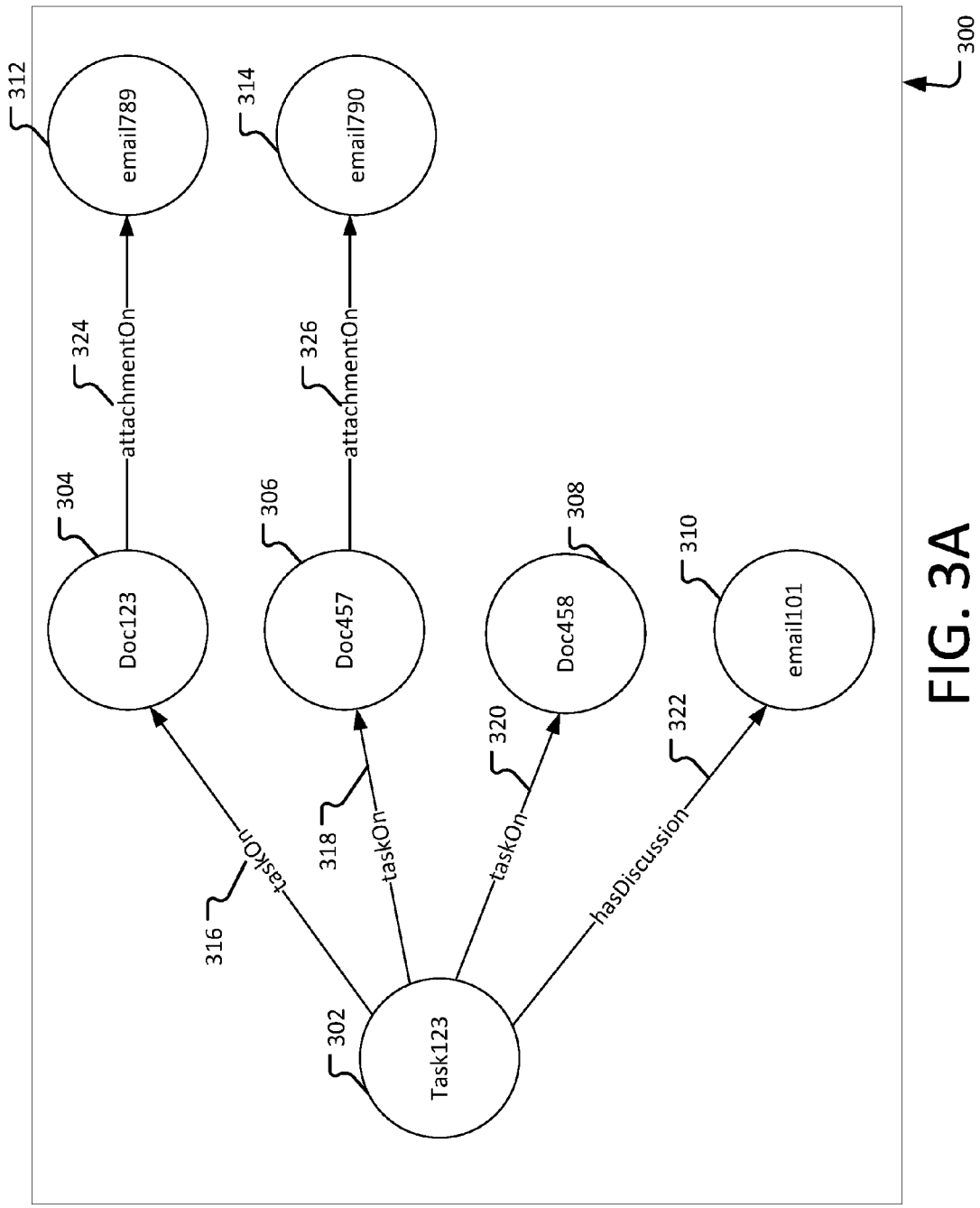
FIG. 3A illustrates an overview of an example isolated collection.

FIG. 3A illustrates an example isolated collection 300 of asserted resource identifiers and corresponding relationships. Example isolated collection 300 comprises resource identifiers 302, 304, 306, 308, 310, 312 and 314, and relationships 316, 318, 320, 322, 324 and 326. In aspects, isolated collection 300 may be generated and/or manipulated using a collection creation utility that may be included as part of a Set creation application as discussed above. When presented in graph form as depicted in the FIG. 3A, each resource identifier may be referred to as a "node" and each relationship may be referred to as an "edge." The collection creation utility may also identify resources and/or determine resource types for collections using one or more rulesets that may include rules defined in accordance with Semantic Web technologies, such as resource description framework (RDF), RDF schema (RDFS), SPARQL Protocol and RDF Query Language (SPARQL), Web Ontology Language (OWL), etc. For example, collection 300 includes a resource identifier 312 that represents an underlying resource, "email789" in the depicted example. Similarly, resource identifier 304 represents a resource document, "Doc123," and resource identifier 302 represents a resource task, "Task123." Each of the resources and relationships included in the isolated collection 300 may have been asserted by a developer through a Sets creation application. For instance, a developer may manually add each of the resource identifiers and the relationships between the resource identifiers. As an example, the developer may manually indicate that the "task123" is a task on "Doc123," as represented in the collection 300 by the "taskOn" relationship 316. The resource identifiers and relationships may also be asserted by an external bot or application created by a developer. For instance, an add-in may be programmed to monitor activity in a browser or other application to track usage of the application. Based on the usage of the application, the add-in sends additional resources and relationships to be included in the collection 300.

In contrast to the asserted resource identifiers and relationships, a collection creation utility may execute a ruleset to determine additional relationships and resource types, referred to herein as "inferred relationships" and "inferred resource identifiers" or "inferred resource types." For example, upon execution of a ruleset, the collection creation utility may determine that resource identifier 312 represents an email message, and resource identifier 304 represents a document. Generation of inferred relationships and resources is discussed in further detail below.

Isolated collection 300 further depicts that resource identifier 302 is associated with resource identifiers 304, 306 and 308 and resource identifier 310. The collection creation utility may determine that the resource identifier 302 represents a task to be performed on identifiers 304, 306, and 308. Based on this determination, the collection creation utility may assign relationships 316, 318 and 320 (e.g., "taskOn") to define the association between resource identifier 302 and resource identifier 304, 306 and 308. In other examples, the relationships 316, 318, and 320 may be asserted, as discussed above. Additional relationships, such as the "hasDiscussion" relationship 322 may have been asserted manually by a developer or asserted from an add-in of an e-mail application that analyzed the content of e-mail 101. While specific types of resources and relationships are described in FIG. 3A, one of skill in the art will appreciate that other types of resources and/or relationships may be included in an isolated collection without departing from the spirit of this disclosure.

Figure 3C:
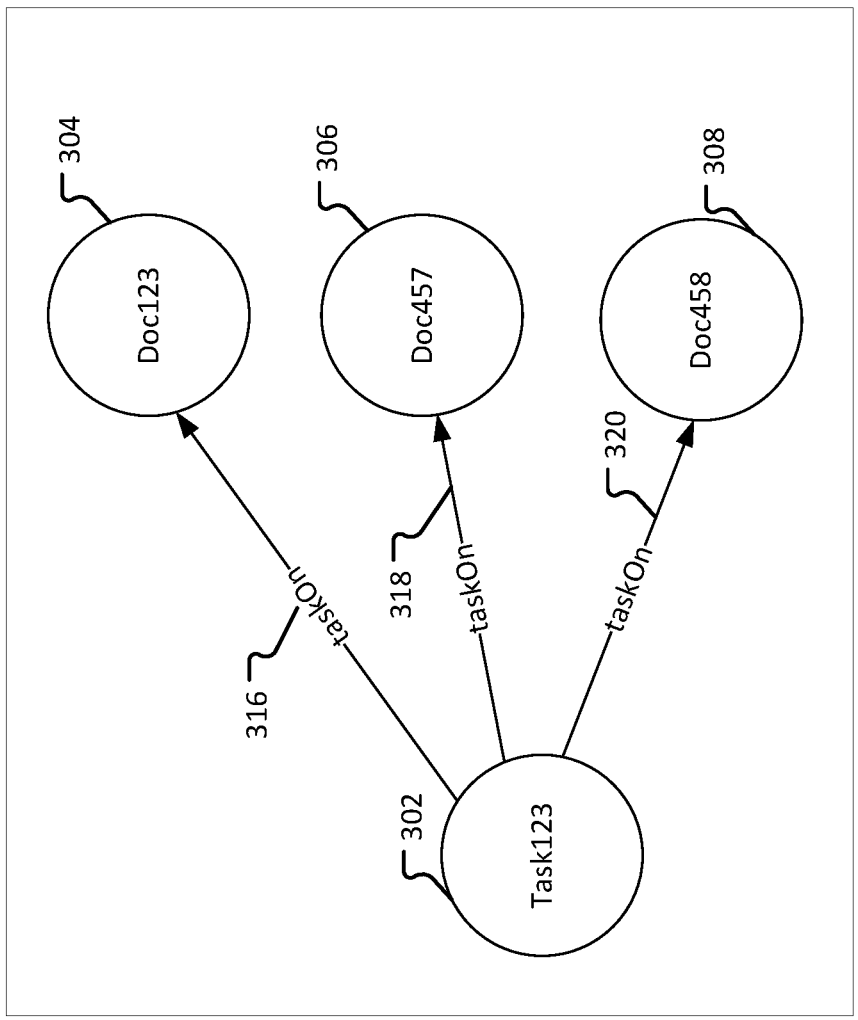
FIGS. 3B-3E illustrate an example query model that may be used to traverse an isolated collection.
Figure 3B:
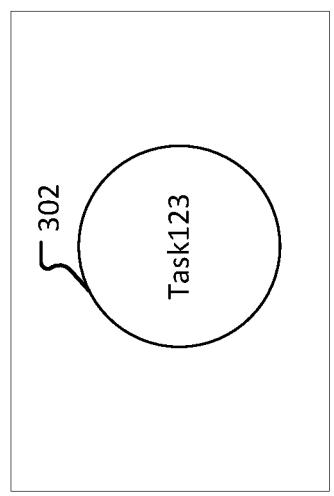
Figure 3D:
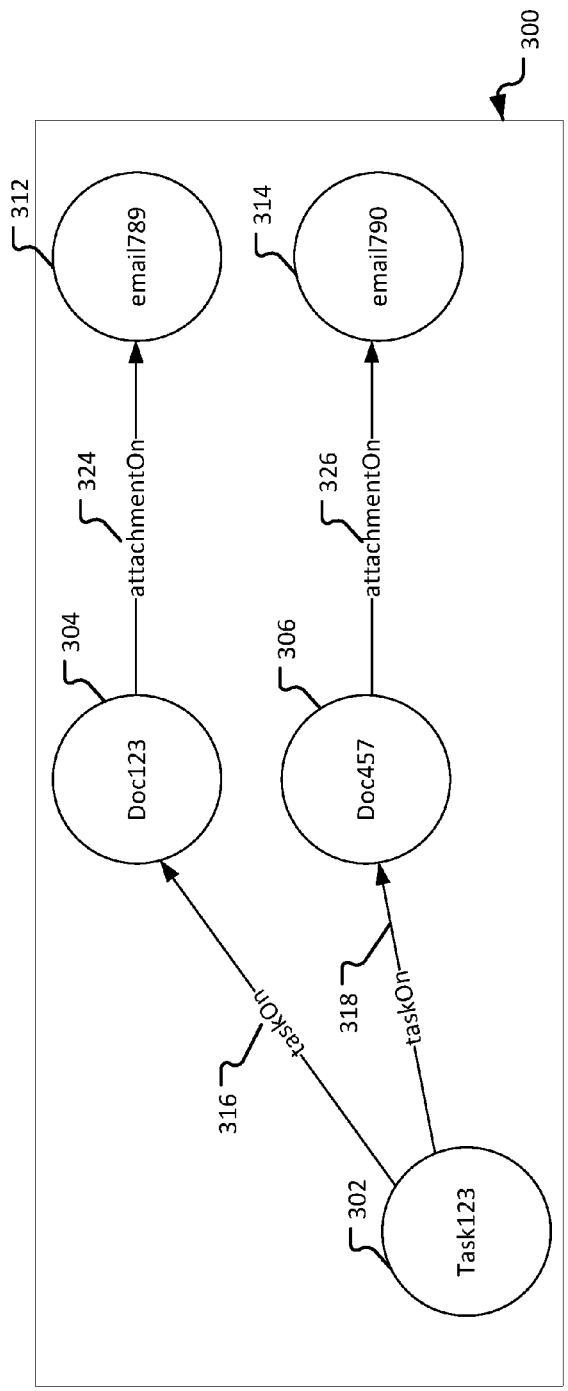
Figure 3E:
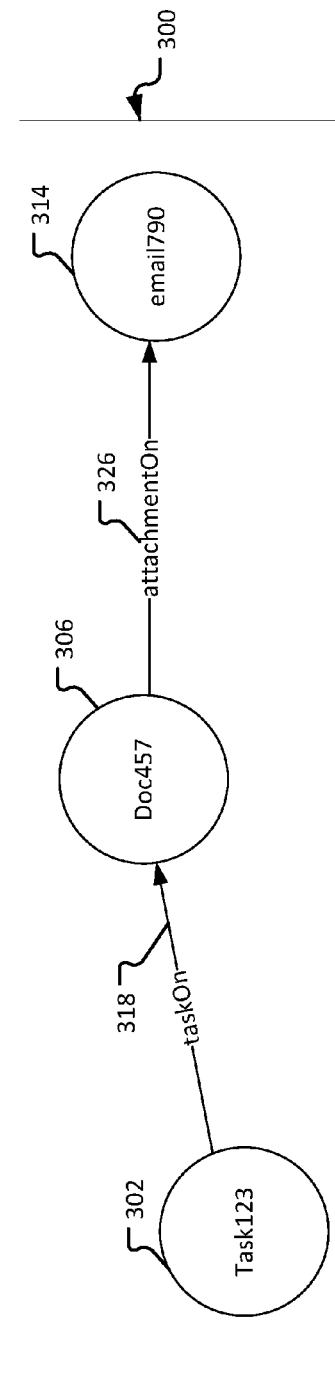

FIGS. 3B-3E illustrate an example query model that may be used to traverse collection 300. In aspects, queries may be executed via an interface provided by the collection creation utility. A query may be executed against one or more files and/or directories comprising information, such as resource identifiers, resource type, resource metadata, permission data, etc. The query results may be visualized in a graph form as one or more collections, such as collection 300. For example, the entire collection 300 dataset may comprise only those elements illustrated in collection 300 (e.g., resource identifiers 302, 304, 306, 308, 310, 312 and 314 and relationships 316, 318, 320, 322, 324 and 326). In this particular example, resource identifier 312 may represent an email comprising the subject "API Design" and resource identifier 314 may represent an email comprising the subject "Sets." The query 'http://.../collection300/task123' may be executed against collection 300. The query results may comprise resource identifier 302 and be visualized as illustrated in FIG. 3B. In FIG. 3C, the query has been amended to 'http://.../collection300/task123?$expand=taskOn' and executed against collection 300. The query results may comprise resource identifiers 302, 304, 306 and 308 and relationships 316, 318 and 320, and be visualized as illustrated in FIG. 3C. In FIG. 3D, the query has been amended to 'http://.../collection300/task123?$expand=taskOn ($expand=attachmentOn)' and executed against collection 300. The query results may comprise resource identifiers 302, 304, 306, 308, 312 and 314 and relationships 316, 318, 320, 324 and 326, and be visualized as illustrated in FIG. 3D. In FIG. 3E, the query has been amended to 'http://.../collection300/task123?$expand=taskOn ($expand=attachmentOn($filter=Subject eq 'Sets'))' and executed against collection 300. As only resource identifier comprises 314 the subject "Sets", the query results may comprise resource identifiers 302, 306 and 314 and relationships 318 and 326, and be visualized as illustrated in FIG. 3E.

Figure 4:
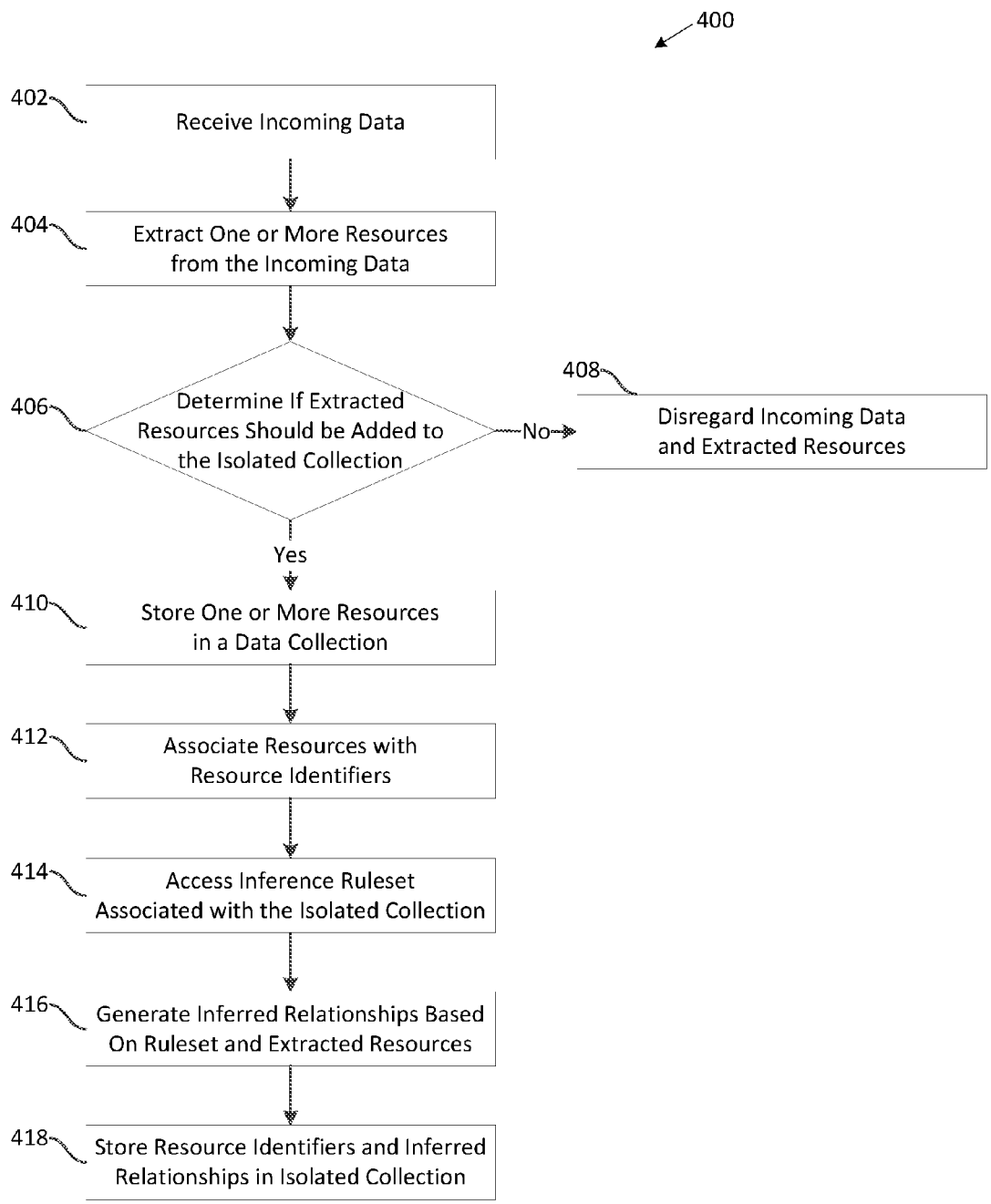
FIG. 4 illustrates an example method for adding incoming data to an isolated collection.

FIG. 4 illustrates an example method 400 for adding incoming data to an isolated collection. At operation 402, incoming data may be received. The data may be received as the result of an event notification from a remote system. In an example, the event notification may be in the form of a callback notification (e.g., a webhook callback). The incoming data may be received in a variety of formats, including, but not limited to, JSON, XML, or HTML. One of skill in the art will appreciate that alternative data formats may be used without departing from the spirit of this disclosure.

At operation 404, one or more resources may be extracted from the incoming data. In one example, the incoming data may comprise only one extracted resource or the incoming data may itself be the resource. In another example, resources may be extracted based on the structure, syntax, or format of the incoming data. For example, extracting one or more resources may comprise evaluating markup language syntax within the incoming data in order to parse the incoming data into one or more variables or data structures. In other examples, the extracted resources may relate to information about the incoming data, including, but not limited to, an identifier associated with the incoming data (e.g., a source URL), a data or resource type, a timestamp (e.g., relating to a modification date, date of receipt, or creation date), among others.

Moving to operation 406, an optional determination may be made whether the extracted resources should be added to the isolated collection. The determination may be based on a variety of factors, including the contents of the one or more resources, the source of the incoming data, or the state of the isolated collection, among others. If the extracted resources should not be added to the isolated collection, flow branches No to operation 408, where the incoming data and extracted resources may be disregarded. Alternatively, a notification may be provided to a user, software process, or other system even though the isolated collection wasn't updated. As an example, the notification may provide a notification that an error occurred. After operation 408, flow terminates.

If it is determined that the extracted resources should be added to the incoming data, flow branches Yes from optional decision operation 406 to operation 410, where one or more resources may be stored in a data collection, thereby storing the one or more resources within a storage system. In another example, the extracted resource may instead reside on a remote server (e.g., the resource may be stored on a remote web server), such that the isolated collection may then use an associated resource identifier to retrieve the resource from the remote server. Moving to operation 412, the extracted resources may be associated with resource identifiers. In some examples, the associated resource identifiers may be generated in response to receiving the incoming data. In other examples, the resource identifiers may have been received alongside the extracted resources within the incoming data. A resource identifier may be a uniform resource identifier used to retrieve the extracted resource from a data collection. In another example, a resource identifier may comprise a uniform resource locator that may be used to access the associated resource on a remote web server. A resource identifier may later be used to determine the location of or additional information about an associated resource. This may include parsing the resource identifier using, for example, regular expressions, providing one or more portions of the resource identifier to a search utility, executing the resource identifier, etc.

Figure 6:
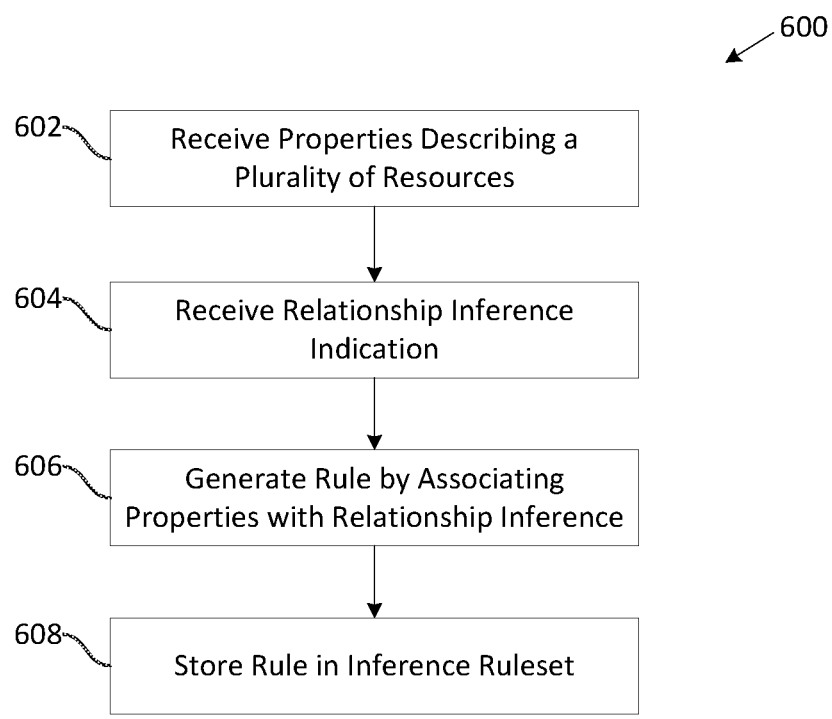
FIG. 6 illustrates an example method for creating an inference rule.

Flow then moves to operation 414, where an inference ruleset associated with the isolated collection may be accessed. The inference ruleset may comprise rules which may be applied to the extracted resources. In some examples, an inference ruleset may be further associated with certain attributes or characteristics of the extracted resources or the received incoming data (e.g., the source of the data, the type of data, etc.). In one example, rules within the inference ruleset may be created by providing properties that enable an inference to be made about a relationship between a plurality of resources. The relationship may be defined and associated with the provided properties, thereby creating an inference rule. The inference rule may then be stored in an inference ruleset. FIG. 6 further describes inference rule creation.

At operation 416, inferred relationships may be generated based upon the inference ruleset and the extracted resources In some examples, the inferred relationships may be generated upon receipt of the callback notification. In other examples, the inferred relationships may be generated at a later time, such as when the isolated collection is next accessed or queried, or in response to the execution of a scheduled operation. Rules within the inference ruleset may be evaluated against the one or more extracted resources to determine whether any inferred relationships should be generated. In some examples, pre-existing relationships (e.g., inferred relationships and/or asserted relationships) within the isolated collection may also be considered when evaluating the inference rules. The inferred relationships may describe relationships among extracted resources or between extracted resources and resources already existing in the isolated collection. In some examples, generating inferred relationships within the isolated collection may comprise creating new relationships, updating pre-existing relationships, or some combination thereof.

Moving to operation 418, the resource identifiers from operation 412 and the inferred relationships from operation 416 may be stored in the isolated collection. In one example, the inferred relationships may be stored within the isolated collection. In another example, rather than storing the inferred relationships within the isolated collection, the inference ruleset may be associated with the isolated collection such that the inference ruleset may be used to dynamically generate the inferred relationships in response to a query or other access request. The contents and/or structure of the isolated collection may be determined to meet a defined isolated collection state, which may result in one or more callback notifications. This is discussed in greater detail below with respect to FIG. 5. After operation 418, flow terminates.

Figure 5:
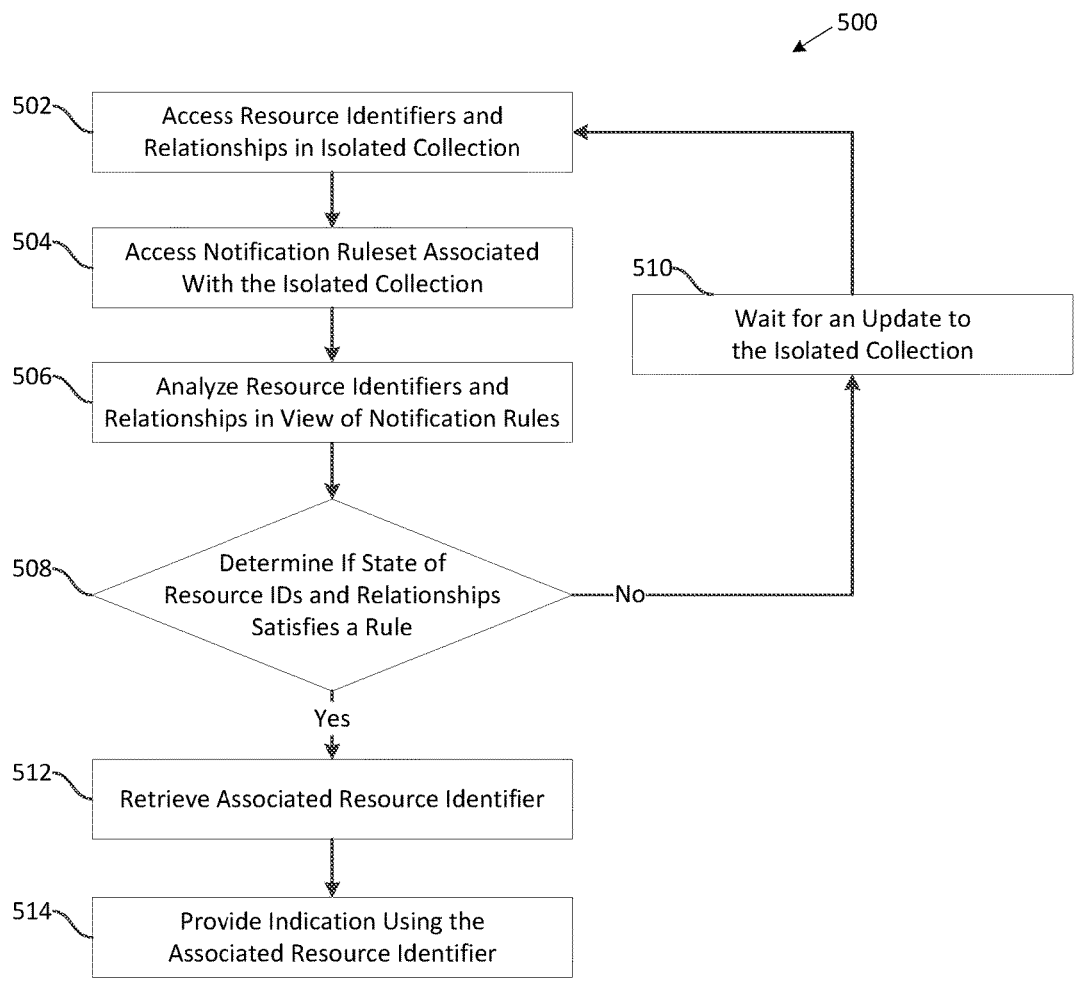
FIG. 5 illustrates an example method for generating notifications based on the state of an isolated collection.
Figure 7:
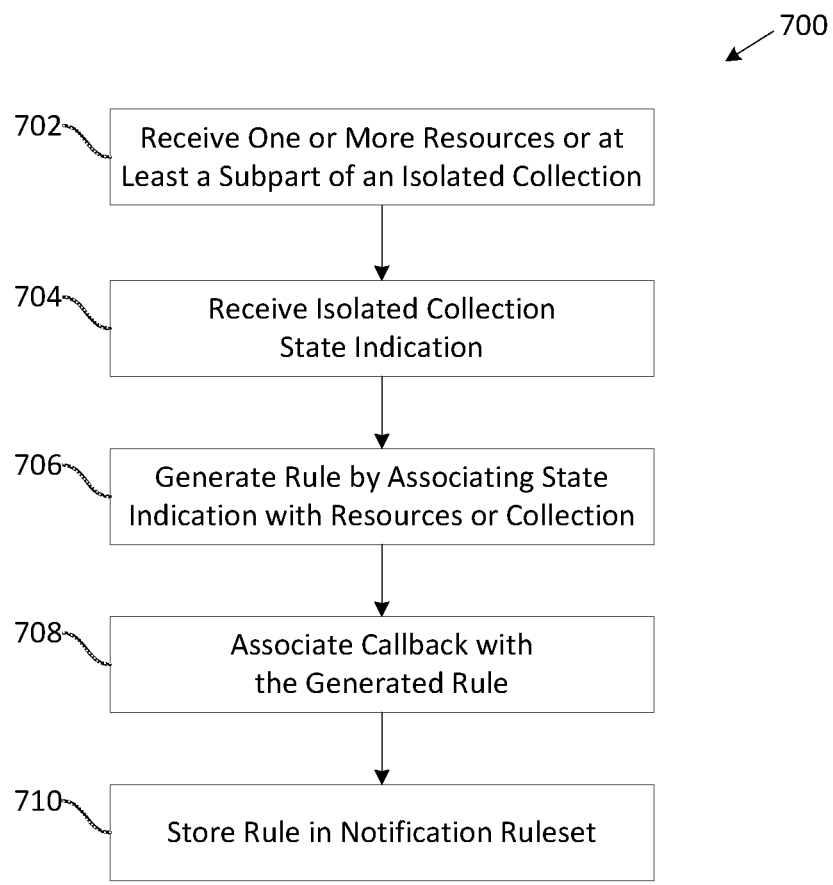
FIG. 7 illustrates an example method for creating a notification rule.

FIG. 5 illustrates an example method 500 for generating notifications based on the state of an isolated collection. Flow begins at operation 502 where one or more resource identifiers and relationships (e.g., inferred relationships and asserted relationships) stored within an isolated collection may be accessed. At operation 504, a notification ruleset associated with the isolated collection may be accessed. The notification ruleset may comprise notification rules. In some examples, a notification rule may comprise an isolated collection state and an associated callback. FIG. 7 further describes notification rule creation.

Moving to decision operation 508, the state of the resource identifiers and relationships is evaluated to determine if any of the rules within the notification ruleset have been satisfied. In some examples, a rule may specify an isolated collection state, which indicates a requirement that one or more relationships exist among a plurality of resource identifiers or associated resources. In another example, a rule may be a notify-on-change rule, wherein if at least one resource is modified or updated, a callback notification may be provided to one or more of the other resources. Alternatively, a callback notification may be provided to a user, an application, a device, or any other type of entity associated with the isolated collection. In one example, a notify-on-change rule may be indicated as a relationship among a plurality of resource identifiers, wherein at least one of the resource identifiers may be the recipient of a callback notification.

If, at decision operation 508, it is determined that no rules in the notification ruleset have been satisfied, flow branches No to operation 510, where flow pauses until an update to the isolated collection occurs. Once an update occurs, flow resumes at operation 502 as described above.

If, however, it is determined that one or more of the rules in the notification ruleset have been satisfied, flow branches Yes to operation 512, where the resource identifier associated with the callback may be retrieved. As described above, a notification rule may comprise an isolated collection state and an associated callback. In some examples, a notification rule may further comprise an indication regarding what type of data should be included with the callback notification. This indication may specify the type of data, scope of data, and/or format of data, among others. The associated callback notification may define a recipient. In an example, the callback notification recipient may be a resource within an isolated collection comprising a resource identifier associated with a recipient resource. The resource identifier may be associated with a computing device, including a storage system, a mobile device, a remote server, or a computing cluster. One of skill in the art will appreciate that other electronic devices may be the recipient of the callback notification without departing from the spirit of this disclosure. In one example, the recipient resource may comprise a webhook, further comprising a URL, identity token, and/or authentication information. In another example, the resource identifier may be associated with a person.

At operation 514, the resource identifier may be used to provide a callback notification. Associated data may be provided within the callback notification. In some examples, the notification rule may specify a variety of parameters including the type of data, scope of data, and/or format of data, among others. The callback notification may be provided to the resource associated with the resource identifier. In one example, the notification may be provided by transmitting the notification to a computing device. In some examples, the notification may be provided using a webhook callback via an HTTP POST request. If the resource identifier is associated with a person, the person may be notified using a means of electronic communication, including electronic mail, instant message, text message, or an on-screen notification. One of skill in the art will appreciate that other notification methods may be used without departing from the spirit of this disclosure. Flow terminates after operation 514.

FIG. 6 illustrates an example method 600 for creating an inference rule. At operation 602, properties may be received that describe a plurality of resources. These properties may enable inferences to be made about a relationship between the plurality of resources. At operation 604, a relationship inference indication is received. The relationship inference indication may be received from a user (e.g., an end user, a system administrator, etc.) via a graphical user interface or from another software system using an API or similar communication method. In some examples, the relationship inference indication may be received from another component within the isolated collection, wherein the other component has automatically generated the inference rule indication. The relationship inference indication may provide descriptive information about the inferred relationship (e.g., what does the relationship indicate, what should the relationship be titled, etc.).

Moving to operation 606, an inference rule may be generated by associating the properties with the relationship inference. As a result, the inference rule may provide an indication that when a plurality of resources exhibit a certain set of properties or characteristics, the relationship inference received in operation 604 may be applied to infer a relationship among the plurality of resources.

At operation 608, the inference rule is stored in the inference ruleset. In one example, an inference ruleset may be associated with an isolated collection. In some examples, there may be multiple inference rulesets associated with an isolated collection. An inference ruleset may also be associated with certain resource attributes or characteristics, or a received callback notification (e.g., the source of the notification, the type of data contained within the notification, etc.). Flow terminates at operation 608.

FIG. 7 illustrates an example method 700 for creating a notification rule. At operation 702, one or more resources or at least a subpart of an isolated collection may be received. Moving to operation 704, an isolated collection state indication may be received. In one example, the isolated collection state may indicate a requirement that one or more relationships exist among a plurality of resource identifiers or associated resources. The plurality of resource identifiers or associated resources may relate to the received resources or isolated collection subpart. In an example, the state indication may comprise a notify-on-change indication, wherein if at least one specified resource is modified or updated, a callback notification may be provided to one or more of the other resources. In another example, the state indication may require a document resource have a "contributor" relationship with two or more authors, thereby indicating that a notification should be provided when the document has been edited or reviewed by at least two people. Another example state indication would be a requirement that an isolated collection have a certain number of resources (e.g., provide a notification after there are 90 resources within an isolated collection, wherein the resources comprise daily financial reports).

At operation 706, a notification rule may be generated by associating the state indication with the received resources or isolated collection subpart. In some examples, a notify-on-change rule may be generated as a relationship among a plurality of resource identifiers, wherein at least one of the resource identifiers will be the recipient of a callback notification. In one example, the notification rule may be generated by a user (e.g., an end user or system administrator) using a software application. In another example, the notification rule may be derived from a variety of sources, including, but not limited to, other notification rules, inference rules, the type of resources contained within an isolated collection, the contents of the isolated collection, etc. In some examples, the notification rule may be received from another software system using an API or similar communication method.

Moving to operation 708, a callback may be associated with the generated rule. In some examples, the callback may define a recipient. The callback may also specify the type of information to include within the callback, the format of the data, the scope of the data, among others. In an example, the callback recipient may be a resource within an isolated collection comprising a resource identifier associated with a recipient resource. The resource identifier may be associated with a computing device, including a storage system, a mobile device, a remote server, or a computing cluster. One of skill in the art will appreciate that other electronic devices may receive the callback notification without departing from the spirit of this disclosure. In one example, the recipient resource may comprise a webhook, further comprising a URL, identity token, and/or authentication information. In another example, the resource identifier may be associated with a person. The person may be notified using a means of electronic communication, including electronic mail, instant message, text message, or an on-screen notification. One of skill in the art will appreciate that other notification methods may be used without departing from the spirit of this disclosure.

Flow terminates at operation 710, where the notification rule may be stored in the notification ruleset. Storing the notification rule in the notification ruleset may comprise updating metadata associated with the isolated collection. In some examples, the notification ruleset may be stored remotely, or the notification ruleset may be stored locally with the isolated collection. In an example, as a result of storing the notification rule in the notification ruleset, a new version of the notification ruleset may be created, wherein the old version of the notification ruleset captures the state of the ruleset prior to the addition of the new notification rule.

Figure 8:
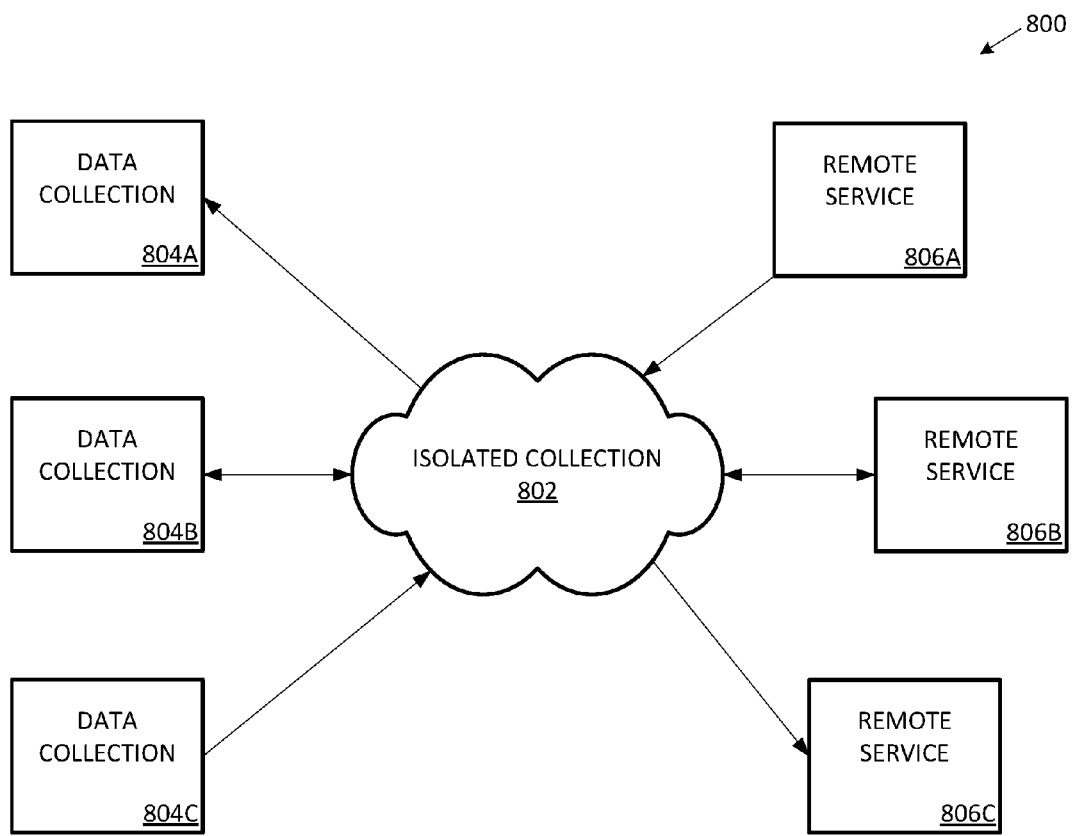
FIG. 8 illustrates an overview of an example system for ingress and egress of data using callback notifications.

FIG. 8 illustrates an overview of an example system 800 for ingress and egress of data using callback notifications. Example system 800 comprises isolated collection 802, data collections 804A-804C, and remote services 806A-806C. Data ingress and egress may occur between isolated collection 802, data collections 804A-804C, and remote services 806A-806C by way of callback notifications. In some examples, a callback notification may be a webhook. Isolated collection 802 may comprise one or more relationship identifiers and relationships (e.g., asserted relationships and inferred relationships). A relationship identifier may be associated with a resource stored on or made available by data collections 804A-804C or remote services 806A-806C.

In an example, isolated collection 802 may receive a callback notification from data collections 804B and 804C, or from remote services 806A and 806B. The callback notification may thereby permit data ingress to isolated collection 802 from collections 804B and 804C, or from remote services 806A and 806B. The callback notification may be a webhook. In some examples, the callback notification may contain one or more resources, which may be extracted by isolated collection 802. Isolated collection 802 may then use the extract resources to infer relationships among the extracted resources using inference rules from one or more inference rulesets (see FIGS. 4 and 6). Isolated collection 802 may then associate resource identifiers with the extracted resources and store the resource identifiers and inferred relationships, thereby updating isolated collection 802.

As a result of or independent from the update, data collections 804A and 804B may receive a callback notification from isolated collection 802. Similarly, remote services 806B and 806C may receive a callback notification from isolated collection 802. The callback notification sent by isolated collection 802 may permit data egress from isolated collection 802 to data collections 804A and 804B, as well as to remote services 806B and 806C. The callback notification may comprise additional information about the content or structure of isolated collection 802 (e.g., one or more resource identifiers or associated resources, one or more relationships, or a change notification). In some examples, the callback notification may be a webhook. The callback notification may result from a determination that a defined isolated collection state has been achieved, as specified by a notification rule in a notification ruleset (see FIGS. 5 and 7). As a result of the callback notification, data collections 804A and 804B or remote services 806B and 806C may perform additional processing. Additional processing may include providing an event notification to people or other software components, or updating data stored by the remote service, among other actions.

FIGS. 9-12 and the associated descriptions provide a discussion of a variety of operating environments in which aspects of the disclosure may be practiced. However, the devices and systems illustrated and discussed with respect to FIGS. 9-12 are for purposes of example and illustration and are not limiting of a vast number of computing device configurations that may be utilized for practicing aspects of the disclosure, described herein.

Figure 9:
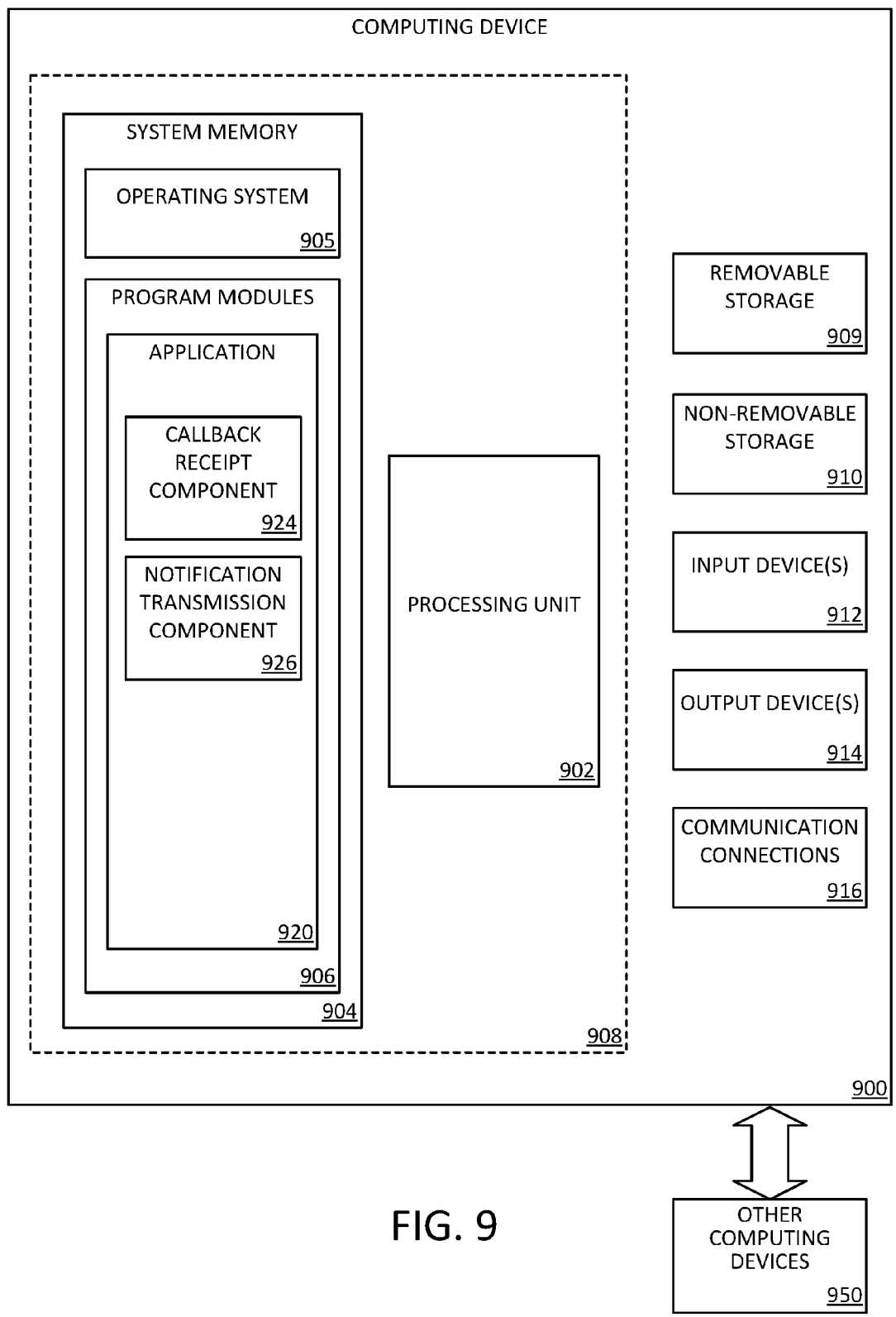
FIG. 9 is a block diagram illustrating example physical components of a computing device with which aspects of the disclosure may be practiced.

FIG. 9 is a block diagram illustrating physical components (e.g., hardware) of a computing device 900 with which aspects of the disclosure may be practiced. The computing device components described below may be suitable for the computing devices described above, including the client computing devices 102A-C and the server computing devices 106A-C. In a basic configuration, the computing device 900 may include at least one processing unit 902 and a system memory 904. Depending on the configuration and type of computing device, the system memory 904 may comprise, but is not limited to, volatile storage (e.g., random access memory), non-volatile storage (e.g., read-only memory), flash memory, or any combination of such memories. The system memory 904 may include an operating system 905 and one or more program modules 906 suitable for performing the various aspects disclosed herein such as a callback receipt component 924 and notification transmission component 926. The operating system 905, for example, may be suitable for controlling the operation of the computing device 900. Furthermore, embodiments of the disclosure may be practiced in conjunction with a graphics library, other operating systems, or any other application program and is not limited to any particular application or system. This basic configuration is illustrated in FIG. 9 by those components within a dashed line 908. The computing device 900 may have additional features or functionality. For example, the computing device 900 may also include additional data storage devices (removable and/or non-removable) such as, for example, magnetic disks, optical disks, or tape. Such additional storage is illustrated in FIG. 9 by a removable storage device 909 and a non-removable storage device 910.

As stated above, a number of program modules and data files may be stored in the system memory 904. While executing on the processing unit 902, the program modules 906 (e.g., application 920) may perform processes including, but not limited to, the aspects, as described herein. Other program modules that may be used in accordance with aspects of the present disclosure may include electronic mail and contacts applications, word processing applications, spreadsheet applications, database applications, slide presentation applications, drawing or computer-aided application programs, etc.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 9 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 900 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 900 may also have one or more input device(s) 912 such as a keyboard, a mouse, a pen, a sound or voice input device, a touch or swipe input device, etc. The output device(s) 914 such as a display, speakers, a printer, etc. may also be included. The aforementioned devices are examples and others may be used. The computing device 900 may include one or more communication connections 916 allowing communications with other computing devices 950. Examples of suitable communication connections 916 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 904, the removable storage device 909, and the non-removable storage device 910 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 900. Any such computer storage media may be part of the computing device 900. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 10A:
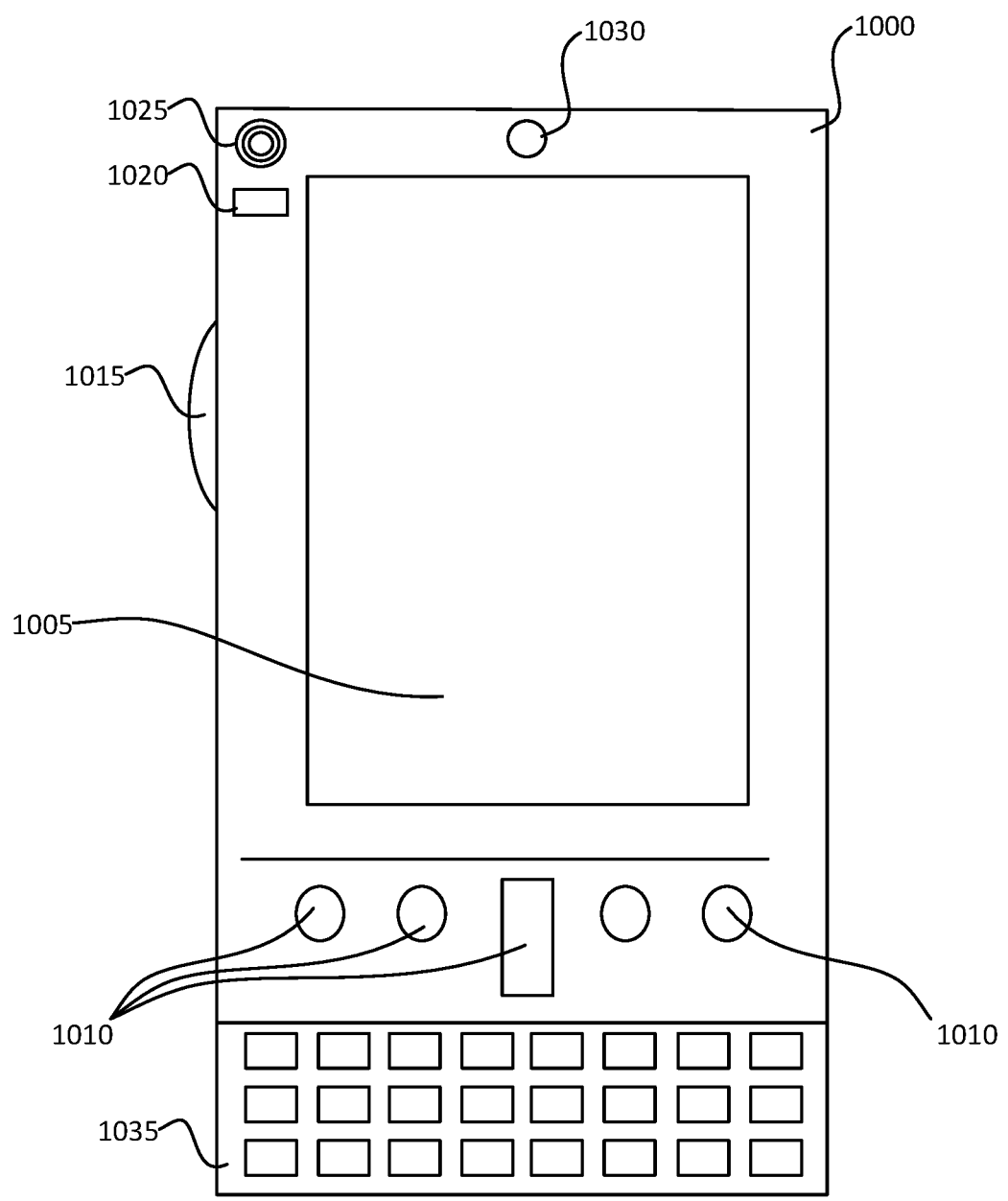
FIGS. 10A and 10B are simplified block diagrams of a mobile computing device with which aspects of the present disclosure may be practiced.
Figure 10B:
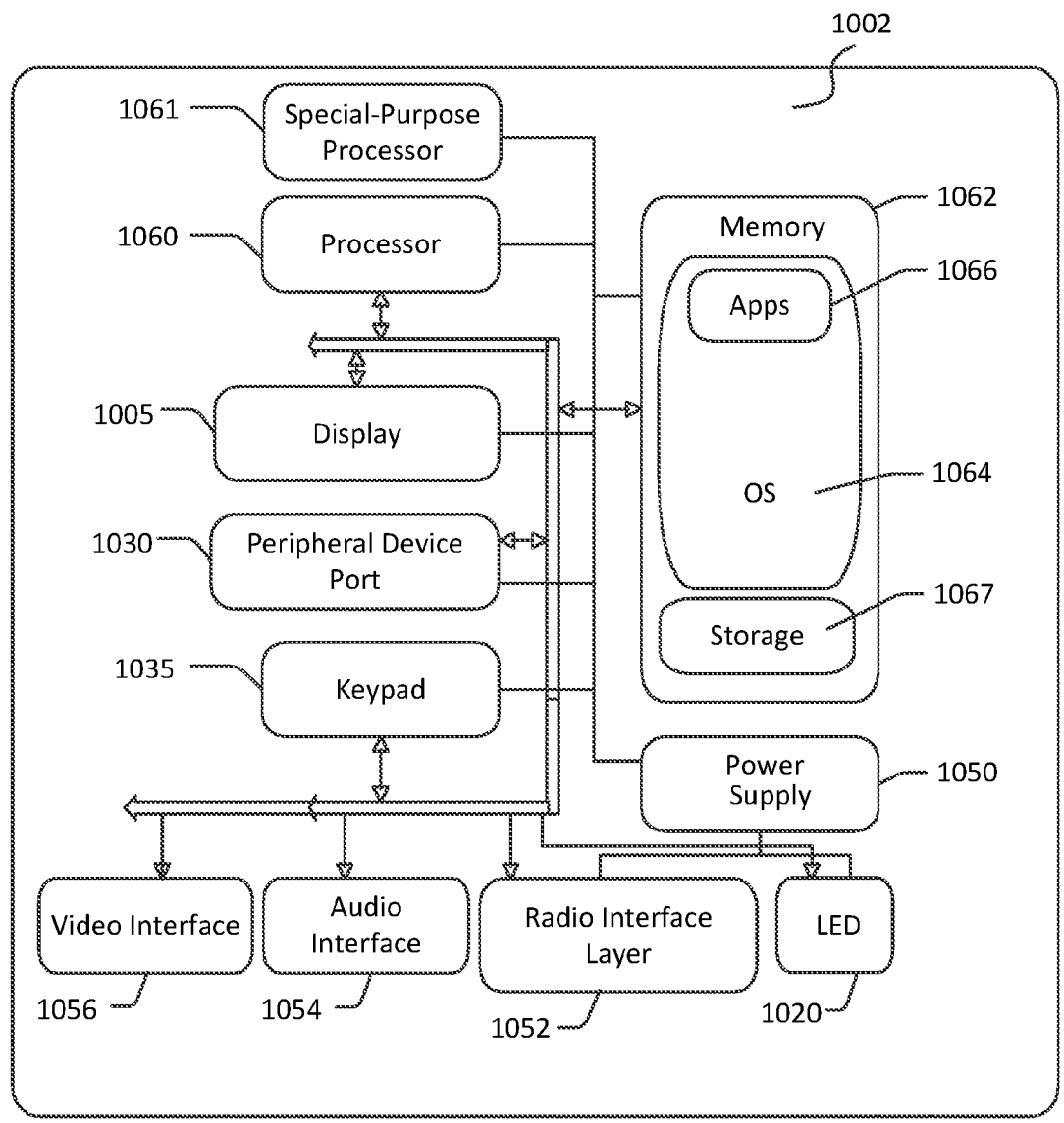

FIGS. 10A and 10B illustrate a mobile computing device 1000, for example, a mobile telephone, a smart phone, wearable computer (such as a smart watch), a tablet computer, a laptop computer, and the like, with which embodiments of the disclosure may be practiced. In some aspects, the client may be a mobile computing device. With reference to FIG. 10A, one aspect of a mobile computing device 1000 for implementing the aspects is illustrated. In a basic configuration, the mobile computing device 1000 is a handheld computer having both input elements and output elements. The mobile computing device 1000 typically includes a display 1005 and one or more input buttons 1010 that allow the user to enter information into the mobile computing device 1000. The display 1005 of the mobile computing device 1000 may also function as an input device (e.g., a touch screen display). If included, an optional side input element 1015 allows further user input. The side input element 1015 may be a rotary switch, a button, or any other type of manual input element. In alternative aspects, mobile computing device 1000 may incorporate more or less input elements. For example, the display 1005 may not be a touch screen in some embodiments. In yet another alternative embodiment, the mobile computing device 1000 is a portable phone system, such as a cellular phone. The mobile computing device 1000 may also include an optional keypad 1035. Optional keypad 1035 may be a physical keypad or a "soft" keypad generated on the touch screen display. In various embodiments, the output elements include the display 1005 for showing a graphical user interface (GUI), a visual indicator 1020 (e.g., a light emitting diode), and/or an audio transducer 1025 (e.g., a speaker). In some aspects, the mobile computing device 1000 incorporates a vibration transducer for providing the user with tactile feedback. In yet another aspect, the mobile computing device 1000 incorporates input and/or output ports, such as an audio input (e.g., a microphone jack), an audio output (e.g., a headphone jack), and a video output (e.g., a HDMI port) for sending signals to or receiving signals from an external device.

FIG. 10B is a block diagram illustrating the architecture of one aspect of a mobile computing device. That is, the mobile computing device 1000 can incorporate a system (e.g., an architecture) 1002 to implement some aspects. In one embodiment, the system 1002 is implemented as a "smart phone" capable of running one or more applications (e.g., browser, e-mail, calendaring, contact managers, messaging clients, games, and media clients/players). In some aspects, the system 1002 is integrated as a computing device, such as an integrated personal digital assistant (PDA) and wireless phone.

One or more application programs 1066 may be loaded into the memory 1062 and run on or in association with the operating system 1064. Examples of the application programs include phone dialer programs, e-mail programs, personal information management (PIM) programs, word processing programs, spreadsheet programs, Internet browser programs, messaging programs, and so forth. The system 1002 also includes a non-volatile storage area 1068 within the memory 1062. The non-volatile storage area 1068 may be used to store persistent information that should not be lost if the system 1002 is powered down. The application programs 1066 may use and store information in the non-volatile storage area 1068, such as e-mail or other messages used by an e-mail application, and the like. A synchronization application (not shown) also resides on the system 1002 and is programmed to interact with a corresponding synchronization application resident on a host computer to keep the information stored in the non-volatile storage area 1068 synchronized with corresponding information stored at the host computer. As should be appreciated, other applications may be loaded into the memory 1062 and run on the mobile computing device 1000 described herein (e.g., search engine, extractor module, relevancy ranking module, answer scoring module, etc.).

The system 1002 has a power supply 1070, which may be implemented as one or more batteries. The power supply 1070 might further include an external power source, such as an AC adapter or a powered docking cradle that supplements or recharges the batteries.

The system 1002 may also include a radio interface layer 1072 that performs the function of transmitting and receiving radio frequency communications. The radio interface layer 1072 facilitates wireless connectivity between the system 1002 and the "outside world," via a communications carrier or service provider. Transmissions to and from the radio interface layer 1072 are conducted under control of the operating system 1064. In other words, communications received by the radio interface layer 1072 may be disseminated to the application programs 1066 via the operating system 1064, and vice versa.

The visual indicator 1020 may be used to provide visual notifications, and/or an audio interface 1074 may be used for producing audible notifications via the audio transducer 1025. In the illustrated embodiment, the visual indicator 1020 is a light emitting diode (LED) and the audio transducer 1025 is a speaker. These devices may be directly coupled to the power supply 1070 so that when activated, they remain on for a duration dictated by the notification mechanism even though the processor 1060 and other components might shut down for conserving battery power. The LED may be programmed to remain on indefinitely until the user takes action to indicate the powered-on status of the device. The audio interface 1074 is used to provide audible signals to and receive audible signals from the user. For example, in addition to being coupled to the audio transducer 1025, the audio interface 1074 may also be coupled to a microphone to receive audible input, such as to facilitate a telephone conversation. In accordance with embodiments of the present disclosure, the microphone may also serve as an audio sensor to facilitate control of notifications, as will be described below. The system 1002 may further include a video interface 1076 that enables an operation of an on-board camera 1030 to record still images, video stream, and the like.

A mobile computing device 1000 implementing the system 1002 may have additional features or functionality. For example, the mobile computing device 1000 may also include additional data storage devices (removable and/or non-removable) such as, magnetic disks, optical disks, or tape. Such additional storage is illustrated in FIG. 10B by the non-volatile storage area 1068.

Data/information generated or captured by the mobile computing device 1000 and stored via the system 1002 may be stored locally on the mobile computing device 1000, as described above, or the data may be stored on any number of storage media that may be accessed by the device via the radio interface layer 1072 or via a wired connection between the mobile computing device 1000 and a separate computing device associated with the mobile computing device 1000, for example, a server computer in a distributed computing network, such as the Internet. As should be appreciated such data/information may be accessed via the mobile computing device 1000 via the radio interface layer 1072 or via a distributed computing network. Similarly, such data/information may be readily transferred between computing devices for storage and use according to well-known data/information transfer and storage means, including electronic mail and collaborative data/information sharing systems.

Figure 11:
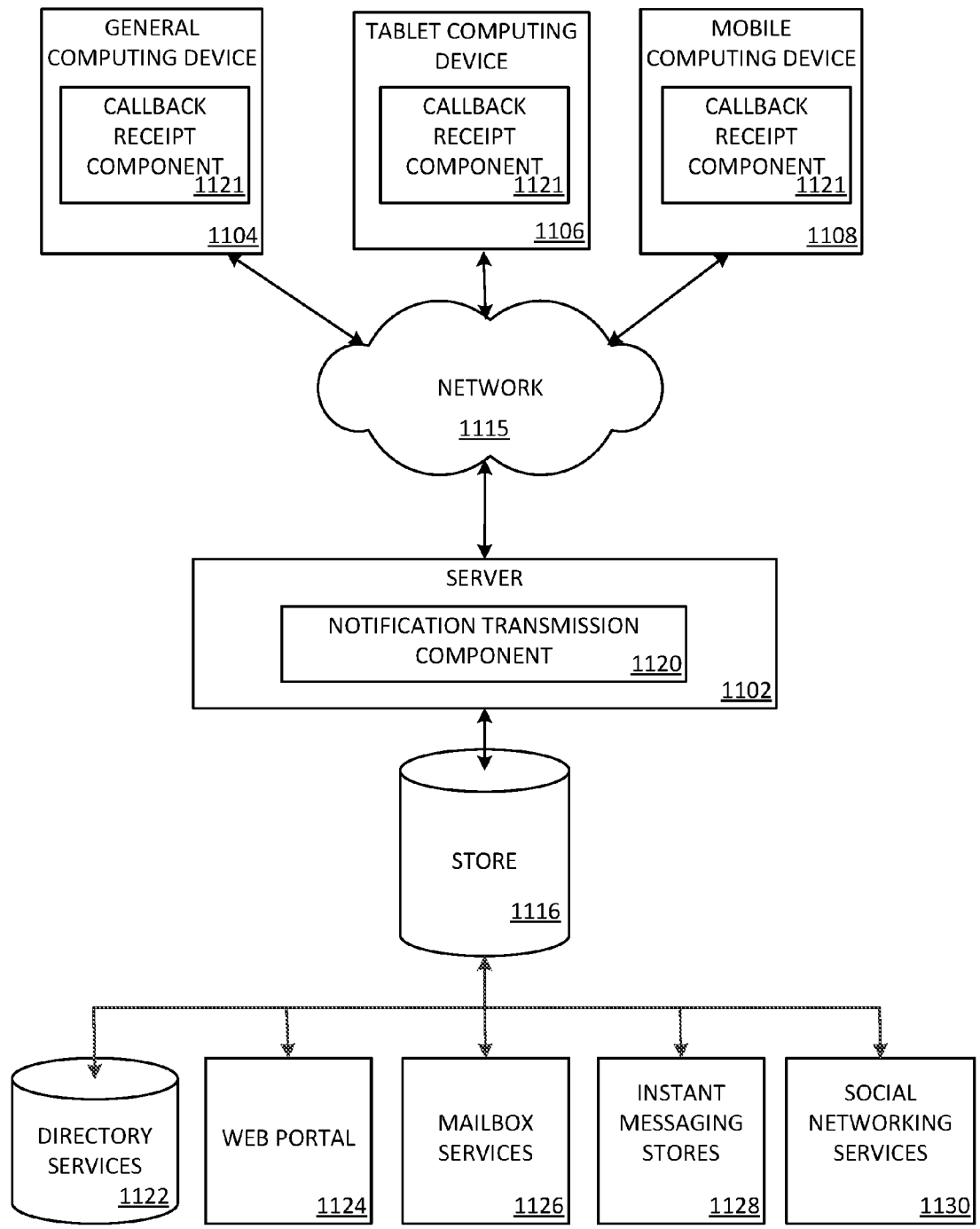
FIG. 11 is a simplified block diagram of a distributed computing system in which aspects of the present disclosure may be practiced.

FIG. 11 illustrates one aspect of the architecture of a system for processing data received at a computing system from a remote source, such as a personal computer 1104, tablet computing device 1106, or mobile computing device 1108, as described above. Content displayed at server device 1102 may be stored in different communication channels or other storage types. For example, various documents may be stored using a directory service 1122, a web portal 1124, a mailbox service 1126, an instant messaging store 1128, or a social networking site 1130. Callback receipt component 1121 may be employed by a client that communicates with server device 1102, and/or notification transmission component 1120 may be employed by server device 1102. The server device 1102 may provide data to and from a client computing device such as a personal computer 1104, a tablet computing device 1106 and/or a mobile computing device 1108 (e.g., a smart phone) through a network 1115. By way of example, the computer system described above may be embodied in a personal computer 1104, a tablet computing device 1106 and/or a mobile computing device 1108 (e.g., a smart phone). Any of these embodiments of the computing devices may obtain content from the store 1116, in addition to receiving graphical data useable to be either pre-processed at a graphic-originating system, or post-processed at a receiving computing system.

Figure 12:
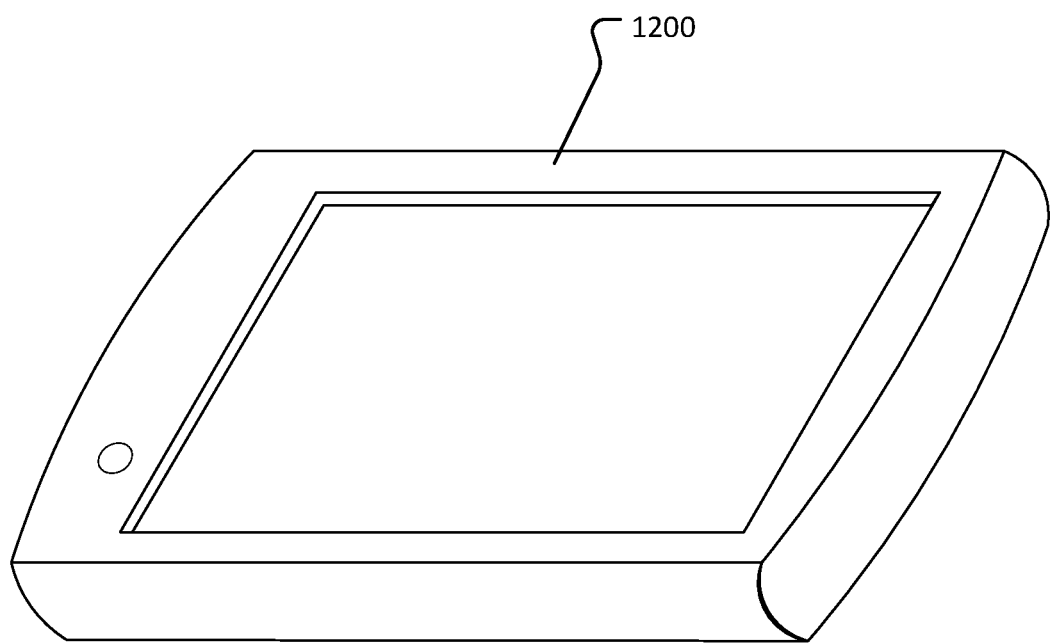
FIG. 12 illustrates a tablet computing device for executing one or more aspects of the present disclosure.

FIG. 12 illustrates an exemplary tablet computing device 1200 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

As will be understood from the foregoing disclosure, one aspect of the technology relates to a system comprising: at least one processor; and a memory storing instructions that when executed by the at least one processor perform a set of operations. The operations comprise accessing one or more resource identifiers and relationships within the isolated collection; accessing one or more notification rules associated with the isolated collection; analyzing the one or more resource identifiers and relationships to determine whether the notification rule has been satisfied; and in response to determining that the notification rule has been satisfied, providing a notification to a recipient. In an example, the recipient is identified by a recipient resource identifier associated with the notification rule. In another example, the recipient resource identifier is associated with a resource comprising a uniform resource identifier and associated identity information such that the notification may be provided to an application programming interface. In one example, the recipient resource identifier comprises a resource identifier associated with one or more other isolated collections. In a further example, the recipient resource identifier comprises a recipient uniform resource identifier, a subscription identifier, and an application identifier. In a yet another example, the notification rule comprises determining that a notify-on-change relationship exists between a plurality of resource identifiers and that a resource or relationship associated with one of the plurality of resource identifiers has changed.

In another aspect, the technology relates to a computer-implemented method for updating an isolated collection based on received data. The method comprises receiving data, wherein the data is provided to the isolated collection as an event notification; extracting one or more resources from the data; associating resource identifiers with the extracted resources; accessing an inference ruleset associated with the isolated collection; processing the extracted resources against the inference ruleset and one or more additional resources from the isolated collection to generate a plurality of inferred relationships among the resources; and storing the resource identifiers and inferred relationships in the isolated collection. In an example, processing further comprises: accessing one or more pre-existing relationships in the isolated collection; determining an update to at least one of the pre-existing relationships is required; and in response to the determination, updating the at least one of the pre-existing relationships based on the contents of the inference ruleset and the extracted resources.

In another example, processing further comprises: accessing one or more pre-existing relationships or resource identifiers in the isolated collection; determining based on the contents of the inference ruleset that one or more inferred relationships will be generated; and in response to the determination, generating one or more inferred relationships based on the content of the inference ruleset, the extracted resources, and the pre-existing relationships or resource identifiers. In a further example, the method further comprises storing at least one of the extracted resources in a data collection. In yet another example, accessing the inference ruleset further comprises: extracting one or more attributes from the data; and selecting the inference ruleset based on an association with the extracted attributes. In one example, the method further comprises analyzing one or more resource identifiers and relationships within the isolated collection to determine whether a notification rule have been satisfied; and in response to determining that the notification rule has been satisfied, providing a notification to a recipient.

In one example, the recipient is identified by a recipient resource identifier associated with the notification rule. In another example, the recipient resource identifier is associated with a resource comprising authentication information for a computer system. In still yet another example, the recipient resource identifier is associated with a resource comprising a uniform resource identifier and associated identity information such that the notification may be provided to an application programming interface. In a further example, the data comprises an indication that the data is associated with a specific isolated collection.

In another aspect, the technology relates to a computer-implemented method for providing notifications based on the contents of an isolated collection. The method comprises accessing one or more resource identifiers and relationships within the isolated collection; accessing one or more notification rules associated with the isolated collection; analyzing the one or more resource identifiers and relationships to determine whether the notification rule has been satisfied; and in response to determining that the notification rule has been satisfied, providing a notification to a recipient identified by a recipient resource identifier. In an example, the recipient resource identifier is associated with a resource comprising a uniform resource identifier and associated identity information such that the notification may be provided to an application programming interface. In another example, the recipient resource identifier comprises a resource identifier associated with one or more other isolated collections. In a further example, the recipient resource identifier comprises a recipient uniform resource identifier, a subscription identifier, and an application identifier.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A computer-implemented method for updating an isolated collection based on received data, the method comprising:
   receiving an event notification comprising event data associated with an event outside the isolated collection;
   parsing the event data to generate an event resource based on the event data;
   generating a resource identifier associated with the event resource;
   accessing an inference ruleset associated with the isolated collection;
   generating at least one inferred relationship for the event resource using the inference ruleset, wherein the at least one inferred relationship associates the event resource and one or more additional resources from the isolated collection; and
   storing the generated event resource and the at least one inferred relationship in the isolated collection using the generated resource identifier, thereby incorporating the event into the isolated collection.

2. The computer-implemented method of claim 1, wherein generating the at least one inferred relationship further comprises:
   accessing one or more pre-existing relationships in the isolated collection;
   determining an update to at least one of the pre-existing relationships is required; and
   in response to the determination, updating the at least one of the pre-existing relationships based on the inference ruleset and the event resource.

3. The computer-implemented method of claim 1, wherein generating the at least one inferred relationship further comprises:
   accessing one or more pre-existing relationships or resource identifiers in the isolated collection;
   determining, based on the inference ruleset, that the at least one inferred relationship will be generated; and
   in response to the determination, generating at least one other inferred relationship based on the inference ruleset, the event resource, and the pre-existing relationships or resource identifiers.

4. The computer-implemented method of claim 1, wherein accessing the inference ruleset further comprises:
   extracting one or more attributes from the event data; and
   selecting the inference ruleset based on an association with the extracted attributes.

5. The computer-implemented method of claim 1, further comprising:
   analyzing one or more resource identifiers and relationships within the isolated collection to determine whether a notification rule has been satisfied; and
   in response to determining that the notification rule has been satisfied, providing a notification to a recipient.

6. The computer-implemented method of claim 5, wherein the recipient is identified by a recipient resource identifier associated with the notification rule.

7. The computer-implemented method of claim 6, wherein the recipient resource identifier is associated with a resource comprising authentication information for a computer system.

8. The computer-implemented method of claim 6, wherein the recipient resource identifier is associated with a resource comprising a uniform resource identifier and associated identity information, and wherein the computer-implemented method further comprises:

providing the notification using an application programming interface based on the uniform resource identifier and associated identity information.

9. The computer-implemented method of claim 1, wherein the event data comprises an indication that the event data is associated with another isolated collection.

10. A system comprising:
at least one processor; and
a memory storing instructions that when executed by the at least one processor perform a set of operations comprising:
receiving an event notification comprising event data associated with an event outside the isolated collection;
parsing the event data to generate an event resource based on the event data;
generating a resource identifier associated with the event resource;
accessing an inference ruleset associated with the isolated collection;
generating at least one inferred relationship for the event resource using the inference ruleset, wherein the at least one inferred relationship associates the event resource and one or more additional resources from the isolated collection; and
storing the generated event resource and the at least one inferred relationship in the isolated collection using the generated resource identifier, thereby incorporating the event into the isolated collection.

11. The system of claim 10, wherein generating the at least one inferred relationship further comprises:
accessing one or more pre-existing relationships in the isolated collection;
determining an update to at least one of the pre-existing relationships is required; and
in response to the determination, updating the at least one of the pre-existing relationships based on the inference ruleset and the event resource.

12. The system of claim 10, wherein generating the at least one inferred relationship further comprises:
accessing one or more pre-existing relationships or resource identifiers in the isolated collection;
determining, based on the inference ruleset, that the at least one inferred relationship will be generated; and
in response to the determination, generating at least one other inferred relationship based on the inference ruleset, the event resource, and the pre-existing relationships or resource identifiers.

13. The system of claim 10, wherein accessing the inference ruleset further comprises:
extracting one or more attributes from the event data; and
selecting the inference ruleset based on an association with the extracted attributes.

14. The system of claim 10, wherein the set of operations further comprises:
analyzing one or more resource identifiers and relationships within the isolated collection to determine whether a notification rule has been satisfied; and
in response to determining that the notification rule has been satisfied, providing a notification to a recipient.

15. The system of claim 14, wherein the recipient is identified by a recipient resource identifier associated with the notification rule.

16. A method for generating a notification based on an updated isolated collection, the method comprising:
receiving an event notification comprising event data associated with an event outside the isolated collection;
parsing the event data to generate an event resource based on the event data;
generating a resource identifier associated with the event resource;
generating at least one inferred relationship for the event resource using an inference ruleset, wherein the at least one inferred relationship associates the event resource and one or more additional resources from the isolated collection;
analyzing one or more resource identifiers and relationships within the isolated collection to determine whether a notification rule has been satisfied; and
in response to determining that the notification rule has been satisfied, providing a notification to a recipient.

17. The method of claim 16, further comprising:
storing the generated event resource and the at least one inferred relationship in the isolated collection using the generated resource identifier, thereby incorporating the event into the isolated collection.

18. The method of claim 16, wherein the recipient is identified by a recipient resource comprising a uniform resource identifier and associated identity information, and wherein the method further comprises:
providing the notification using an application programming interface based on the uniform resource identifier and associated identity information.

19. The method of claim 16, wherein generating the at least one inferred relationship further comprises:
accessing one or more pre-existing relationships in the isolated collection;
determining an update to at least one of the pre-existing relationships is required; and
in response to the determination, updating the at least one of the pre-existing relationships based on the inference ruleset and the event resource.

20. The method of claim 16, wherein generating the at least one inferred relationship further comprises:
accessing one or more pre-existing relationships or resource identifiers in the isolated collection;
determining, based on the inference ruleset, that the at least one inferred relationship will be generated; and
in response to the determination, generating at least one other inferred relationship based on the inference ruleset, the event resource, and the pre-existing relationships or resource identifiers.

* * * * *